United States Patent
Dyllick-Brenzinger et al.

(10) Patent No.: US 7,183,325 B2
(45) Date of Patent: Feb. 27, 2007

(54) DEFORMING AGENT AND/OR DEAERATING AGENT BASED ON OIL-IN-WATER DISPERSIONS

(75) Inventors: Rainer Dyllick-Brenzinger, Weinheim (DE); Markus Kamieth, Dossenheim (DE); Johann Bonn, Hessheim (DE); Manfred Matz, Ludwigshafen (DE); Klaus Lorenz, Worms (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 342 days.

(21) Appl. No.: 10/478,683

(22) PCT Filed: Jun. 4, 2002

(86) PCT No.: PCT/EP02/06129

§ 371 (c)(1),
(2), (4) Date: Dec. 5, 2003

(87) PCT Pub. No.: WO02/098532

PCT Pub. Date: Dec. 12, 2002

(65) Prior Publication Data

US 2004/0176480 A1   Sep. 9, 2004

(30) Foreign Application Priority Data

Jun. 5, 2001   (DE) .................. 101 27 245

(51) Int. Cl.
*B01D 19/04* (2006.01)
*B01F 17/00* (2006.01)
*C09K 3/00* (2006.01)

(52) U.S. Cl. .......... 516/132; 516/72; 516/73; 516/115; 516/133

(58) Field of Classification Search .......... 516/67, 516/68
See application file for complete search history.

(56) References Cited

U.S. PATENT DOCUMENTS

| | | | |
|---|---|---|---|
| 2,346,928 A * | 4/1944 | Lighthipe ............... | 516/133 |
| 3,652,453 A | 3/1972 | MacDonnell | |
| 3,673,105 A | 6/1972 | Curtis | |
| 3,923,683 A | 12/1975 | Michalski et al. | |
| 5,326,499 A * | 7/1994 | Wegner et al. ............ | 516/133 |
| 5,994,415 A * | 11/1999 | Gruning et al. ............ | 516/116 |
| 6,420,324 B1 * | 7/2002 | Ebbrecht et al. ............ | 508/552 |
| 6,864,292 B1 * | 3/2005 | Dyllick-Brenzinger et al. .. | 516/74 |

FOREIGN PATENT DOCUMENTS

| | | |
|---|---|---|
| CA | 1 143 244 | 3/1983 |
| DE | 29 44 604 | 5/1980 |
| DE | 42 32 415 | 3/1994 |
| DE | 196 41 076 | 4/1998 |
| DE | 199 17 186 | 9/2000 |
| EP | 0 149 812 | 7/1985 |
| EP | 0 531 713 | 3/1993 |
| EP | 0 732 134 | 9/1996 |
| GB | 568 510 | 4/1945 |
| GB | 658 494 | 10/1951 |
| WO | 94 06894 | 3/1994 |
| WO | 94/08091 | 4/1994 |
| WO | 00 08254 | 2/2000 |
| WO | 00 44470 | 8/2000 |

OTHER PUBLICATIONS

Ullmann's Encyclopedia of Industrial Chemistry, 5th edition on CD-ROM, 1997 Wiley-VCH, "3.1. Homopolymerization" ( about polyethyleneimines).

* cited by examiner

*Primary Examiner*—Randy Gulakowski
*Assistant Examiner*—Timothy J. Kugel
(74) *Attorney, Agent, or Firm*—Oblon, Spivak, McClelland, Maier & Neustadt, P.C.

(57) ABSTRACT

The present invention relates to novel oil-in-water dispersions which comprise
  a) at least one water-insoluble oxygen-containing organic substance which is solid at room temperature and
  b) at least one amide compound of the formula I,

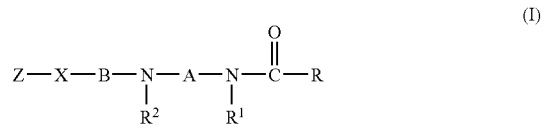

in which the variables R, $R^1$, $R^2$, A, B, X and Z have the meanings given in the description and the claims, and to the use thereof as antifoams and/or deaerators in aqueous systems which have a tendency toward foam formation.

41 Claims, No Drawings

DEFORMING AGENT AND/OR DEAERATING AGENT BASED ON OIL-IN-WATER DISPERSIONS

The present invention relates to oil-in-water dispersions, to the use thereof as antifoams and/or deaerators.

In numerous industrial processes, it is necessary to handle aqueous solutions and suspensions which have a tendency toward foam formation because of their ingredients. This foam formation makes the process difficult to carry out and must therefore be kept as low as possible or avoided altogether. Examples of foam-forming aqueous compositions are detergent-containing compositions, saponin-containing compositions, wastewater in water treatment plants, protein-containing compositions, such as soybean extracts, and, in particular, groundwood- and/or cellulose-containing suspensions, as are used, in particular, in the paper industry for the preparation of paper, paperboard or cardboard.

In addition to the formation of foam, which is subsequently permanently formed from coalescing air bubbles, the air incorporated in these systems, which is in finely disperse, stable form, has proven problematical. The reduction in the air content of these systems is therefore likewise of particular importance.

For these reasons, antifoams and/or deaerators are added to the foam-forming aqueous compositions during their processing and sometimes even during their preparation; these antifoams and/or deaerators, even at low use concentrations, suppress the undesired formation of foam, reduce the content of incorporated air or destroy foam which has already formed.

The antifoams known from the prior art are often aqueous compositions based on oil-in-water dispersions or emulsions, the oil phase of which comprises at least one hydrophobic substance, such as mineral oils, silicone oils, polyalkylene oxides, esters thereof with fatty acids and ethers thereof with long-chain alcohols, native fats and/or oils, waxes, ester waxes or long-chain alcohols. Occasionally, the use of distillation residues which form during the preparation of long-chain alcohols in accordance with the Ziegler process or during oxo synthesis has been reported (see e.g. EP-A 149812, DE).

In some cases, to increase the effect, a further hydrophobic substance is added to the oil phase, e.g. metal stearates, hydrophobicized silicas, polyols partially or completely esterified with fatty acids, or fatty acids.

U.S. Pat. No. 3,673,105, U.S. Pat. No. 3,923,683 and DE-A 2944604 disclose antifoam compositions based on oil-in-water dispersions which, in addition to a liquid hydrocarbon as main constituent, comprise hydrophobicized silica, a bisamide of an alkylenediamine with a $C_6$–$C_{18}$-carboxylic acid, and optionally a silicone oil to improve the effectiveness.

CA 1143244 describes antifoam compositions based on solvent which, in addition to a water-insoluble solvent, comprise a polyethylene oxide/polypropylene oxide block copolymer, a fatty acid amide of ethylenediamine and a fatty alcohol mixture.

EP-A 513173, EP-A 662172 and DE-A 4232415 disclose that polyglycerol esters which are obtainable by at least 20% esterification of polyglycerols which comprise, as essential constituents, di-, tri- and tetraglycerols, with fatty acids improve the antifoaming/deaerating action of compositions based on oil-in-water dispersions.

DE-A 19641076 describes antifoam compositions based on oil-in-water dispersions, the oil phase of which comprises at least one reaction product of a polyol partially esterified with a fatty acid with a dicarboxylic acid to improve the antifoaming action.

EP-A 732 134 discloses antifoam compositions based on oil-in-water dispersions, the oil phase of which comprises at least one ester of a sugar alcohol with at least 4 OH groups or at least 2 OH groups and at least one intramolecular ether bond and a fatty acid with at least 20 carbon atoms in the molecule in the molar ratio $\geq 1:1$ to improve the antifoaming action.

DE-C 19917186 proposes alkylene-linked oligourea derivatives with antifoaming action which have alkyl or arylalkyl groups at least on the terminal nitrogen atoms.

Some of the antifoam systems of the prior art have the disadvantage that their antifoaming/deaerating action is only inadequate at elevated temperature, i.e. above 40° C. and in particular above 50° C. An antifoaming and deaerating action at higher temperatures, however, is important for many industrial processes. Thus, for example, the modern processes of paper manufacture use closed water cycles, as a result of which there is a temperature increase in the aqueous feed materials to generally above 50° C. and sometimes above 55° C. In addition, the antifoams of the prior art sometimes only have inadequate long-term action, i.e. they lose their antifoaming action upon prolonged use. They therefore have to be topped up, which is not desired for economic reasons.

It is an object of the present invention to provide antifoams and/or deaerators for aqueous systems which have a good antifoaming and/or deaerating action even at elevated temperature, e.g. above 40° C., preferably above 50° C. and in particular at 55° C. and above. Furthermore, they should also have good long-term action.

We have found that this object is achieved by oil-in-water dispersions, the oil phase of which comprises, in addition to at least one water-insoluble organic oxygen-containing substance which is solid at room temperature, at least one amide compound of the formula I

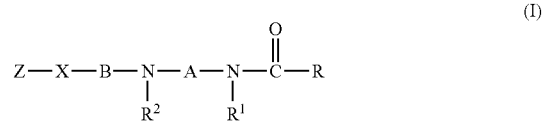

in which the variables R, $R^1$, $R^2$, A, B, X and Z have the following meanings:

R is an aliphatic radical with at least 14 carbon atoms, which may optionally have 1 or 2 hydroxyl groups, 1 or 2 double bonds and/or 1 or 2 triple bonds, A, B, independently of one another, are $C_2$–$C_{20}$-alkylene which may optionally have 1 or 2 OH groups, 1 or 2 double and/or triple bonds and/or be interrupted by one, two or three oxygen atoms which are nonadjacent to heteroatoms, or $C_5$–$C_{20}$-cycloalkylene which may optionally be substituted by 1 or 2 OH groups and/or by 1, 2, 3 or 4 methyl groups and/or may have a carbonyl function as ring member, $R^1$ is hydrogen, $C_1$–$C_{13}$-alkyl, $C_5$–$C_{10}$-cycloalkyl, phenyl or a group of the formula $[A^1-X^1]_m$-$Z^1$, $R^2$ is hydrogen, $C_1$–$C_{13}$-alkyl, $C_5$–$C_{10}$-cycloalkyl, phenyl, a group C(O)—R or a group of the formula $[A^2-X^2]_n$-$Z^2$, X is oxygen or a group N—$R^3$, in which $R^3$ has the following meanings: hydrogen, a group C(O)—R or a group of the formula $[A^3-X^3]_p$-$Z^3$, Z is hydrogen or a group $[A^4\text{-}X^4]_q\text{-}Z^4$,
in which $A^1, A^2, A^3, A^4$, independently of one another, are $C_2$–$C_3$-alkylene, $X^1, X^2, X^3, X^4$, independently of one another, are oxygen or a group $NR^a$, in which $R^a$, independently of the others, is hydrogen, $CH_2CH_2NH_2$, $CH_2CH_2NHC(O)R$, $CH_2CH_2CH_2NH_2$, $CH_2CH_2CH_2NHC(O)R$ or a group $C(O)\text{---}R$, $Z^1, Z^2, Z^3, Z^4$, independently of one another, are hydrogen, $CH_2CH_2NH_2$, $CH_2CH_2NHC(O)R$, $CH_2CH_2CH_2NH_2$ or $CH_2CH_2CH_2NHC(O)R$, and m and q, independently of one another, are a number from 1 to 20, n and p, independently of one another, are a number from 1 to 10,
where $R^1$ with $R^2$ or $R^2$ with $R^3$ and/or any two radicals $R^3$, $R^4$, $R^a$ which are bonded to two nitrogen atoms bonded by an alkylene unit may also be $C_1$–$C_4$-alkylene which may have a carbonyl function and/or may be substituted by 1, 2 or 3 methyl groups,
or the group B—X-Z is hydrogen if A is $C_6$–$C_{20}$-alkylene which is interrupted by one or two oxygen atoms which are nonadjacent to heteroatoms, or is $C_5$–$C_{20}$-cycloalkylene which may optionally be substituted by 1 or 2 OH groups and/or by 1, 2, 3 or 4 methyl groups and/or may have a carbonyl function as ring member, and/or an amidine compound of the formula Ia

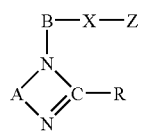

(Ia)

in which R, A, B, X and Z are as defined in formula I,
and/or a reaction product of at least one amide compound of the formula I and/or an amidine compound of the formula Ia which has at least one reactive group RG chosen from alcoholic OH groups and aminic NH or $NH_2$ groups, with at least one crosslinking compound V which has at least bifunctional reactivity toward the reactive groups,
and/or a reaction product of an amino-containing polymer with an aliphatic carboxylic acid of the formula R—COOH in which R has the meaning given above.

Some amide compounds of the formula I are known from EP-A 286336 as active substance in corrosion inhibitor compositions or as precursors for the preparation thereof. Fatty acid amides of hydroxyethylpiperazine are known, for example, from U.S. Pat. No. 5,128,473. DE-A 3309948 describes, inter alia, the use of amide compounds and reaction products thereof with dicarboxylic acids as liquid-loss-reducing compounds in borehole processing liquids.

The present invention therefore provides oil-in-water dispersions, the oil phase of which comprises the following components:

a) at least one water-insoluble oxygen-containing organic substance which is solid at room temperature, chosen from long-chain alcohols with an aliphatic hydrocarbon radical having at least 12 carbon atoms and which may be interrupted by S, SO or $SO_2$, distillation residues which form during the preparation of aliphatic alcohols with at least 14 carbon atoms, mono-, di- and triglycerides of fatty acids, fatty acid esters of aliphatic alcohols with at least 12 carbon atoms, fatty acid esters of $C_1$–$C_{11}$-alkanols and mixtures thereof;

b) at least one amide compound of the above-defined formula I,
and/or an amidine compound of the formula Ia,
and/or a reaction product of at least one amide compound of the formula I which has at least one reactive group RG chosen from alcoholic OH groups and aminic NH or $NH_2$ groups, with at least one crosslinking compound V which has at least bifunctional reactivity toward the reactive groups,
and/or a reaction product of an amino-containing polymer with an aliphatic carboxylic acid of the formula R—COOH in which R has the meaning given above, and optionally the following components:

c) substances which are known to improve the antifoaming action of oil-in-water dispersions;

d) one or more hydrocarbons with a boiling point above 200° C. (at atmospheric pressure).

The present invention further provides for the use of these compositions as antifoams and/or deaerators for aqueous foam-forming compositions, in particular for aqueous, cellulose-containing and/or groundwood-containing compositions, as are used, for example, during the manufacture of paper, paperboard or cardboard.

The expressions alkyl, alkylene and cycloalkyl used in the definition of the variables in formula I are collective terms for individual molecular groups, where the prefix $C_n$–$C_m$ gives the lower and upper limit for the possible number of carbons of these molecular groups.

Thus, alkyl in the definition of R is a linear or branched aliphatic hydrocarbon radical which has at least 14 carbon atoms and may be substituted by 1 or 2 OH groups and which may also have 1 or 2 double or triple bonds. Examples of such radicals are saturated radicals, such as n-tetradecan-1-yl, pentadecan-1-yl, n-hexadecan-1-yl(palmitinyl), n-heptanedecan-1-yl, n-octadecan-1-yl(stearyl), n-nonadecan-1-yl, n-eicosan-1-yl(arachidyl), n-heneicosan-1-yl, n-docosan-1-yl(behenyl), n-tricosan-1-yl, n-tetracosan-1-yl(lignocerin-1-yl), n-pentacosan-1-yl, hexacosan-1-yl(cerotinyl), heptacosan-1-yl, nonacosan-1-yl, triacontan-1-yl, n-tetradecan-2-yl, pentadecan-2-yl, n-hexadecan-2-yl, n-heptanedecan-2-yl, n-octadecan-2-yl, n-nonadecan-2-yl, n-eicosan-2-yl, n-heneicosan-2-yl, n-docosan-2-yl, n-tricosan-2-yl, n-tetracosan-2-yl, n-pentacosan-2-yl, hexacosan-2-yl, heptacosan-2-yl, nonacosan-2-yl, triacontan-2-yl, and also mono- or diethylenically unsaturated radicals derived therefrom, and/or hydroxylated radicals.

$C_1$–$C_{13}$-Alkyl is, accordingly, a linear or branched alkyl radical having 1 to 13 carbon atoms, preferably 1 to 8 and in particular 1 to 6 carbon atoms, such as methyl, ethyl, n-propyl, isopropyl, n-butyl, 2-butyl, isobutyl, tert-butyl, n-pentyl, 2-pentyl, isopentyl, neopentyl, n-hexyl, 2-methyl-1-pentyl, n-heptyl, 2-ethylhex-1-yl, 2-methylhex-1-yl, n-octyl, n-decyl, 2-methyldec-1-yl, n-dodecyl, 2-methyldodecyl, etc.

Alkylene is a divalent linear or branched alkyl group, where the two free valences are preferably located on different carbon atoms. $C_2$–$C_3$-Alkylene is, accordingly, for example 1,2-ethylene, 1,2-propylene or 1,3-propylene. Accordingly, $C_2$–$C_{20}$-alkylene represents the groups given for $C_2$–$C_3$-alkylene, and, for example, represents butane-1,2-diyl, -2,3-diyl, -1,3-diyl or -1,4-diyl, pentane-1,2-diyl, -2,3-diyl, -1,3-diyl, -1,4-diyl, -2,4-diyl or -1,5-diyl, hexane-1,6-diyl, 2,2,4-trimethylpentane-1,4-diyl, octane-1,8-diyl etc. In the alkylene groups, one or two carbon atoms may also be replaced by oxygen atoms, which are neither adjacent to one another nor to the linkage sites. Such alkylene groups generally have 5 to 20 carbon atoms. Examples thereof are:

3-oxapentane-1,5-diyl, 3-oxahexane-1,6-diyl, 4-oxaheptane-1,7-diyl, 3,6-dioxaoctane-1,8-diyl, 3,7-dioxanonane-1,9-diyl, 4,7-dioxadecane-1,10-diyl, 4,8-dioxaundecane-1,11-diyl, 4,9-dioxadodecane-1,12-diyl, 4,11-dioxatetradecane-1,14-diyl.

$C_5$–$C_{10}$-Cycloalkyl is a monovalent mono- or bicycloaliphatic radical with 5 to 10, preferably 5 to 8, carbon atoms, such as cyclopentyl, cyclohexyl or cycloheptyl.

$C_5$–$C_{20}$-Cycloalkylene is a divalent mono- or bicycloaliphatic radical with 5 to 20 carbon atoms, where the two free valences are preferably located on different carbon atoms and, in the case of bicyclic groups, the rings can be fused, spiro or linked together by an alkylene group. Examples thereof are cyclopentane-1,2- and -1,3-diyl, cyclohexane-1,2-diyl, -1,3-diyl and -1,4-diyl, cycloheptane-1,2-diyl, -1,3-diyl and -1,4-diyl, norbornane-2,3-diyl, 2,2-bis(cyclohexyl-4'-yl)propane.

With regard to the antifoaming and deaerating action of the compositions according to the invention, R is preferably a radical with at least 17 carbon atoms, in particular with at least 19 carbon atoms and particularly preferably with at least 21 carbon atoms. R will usually have no more than 40 carbon atoms, preferably no more than 30 carbon atoms. R preferably does not have hydroxyl groups. R is preferably saturated. R is particularly preferably a saturated and unbranched alkyl radical which is preferably linked to the carbonyl group in the 1-position. R is very particularly preferably a linear heneicosan-1-yl radical.

Preference is given to those compounds of the formula I, and to reaction products thereof, which have at least 2 and, in particular, at least 3 groups of the formula R—C(O)—. Preference is also given to mixtures of compounds of the formula I which on average have at least 1.5, in particular at least 2 and particularly preferably at least 3, groups of the formula R—C(O)—.

For the antifoaming/deaerating action of the dispersions according to the invention, it has proven advantageous if, as component b), substances are used which have less than 0.05 mol/kg of aminic NH or $NH_2$ groups, i.e. nonamidated secondary or primary amino groups. The amine number of such substances (determined in accordance with DIN 16945, p. 9, given in mg of KOH/g of substance) will preferably not exceed a value of 3.0, in particular of 2.0 and specifically of 1.0. However, the amine number of component b) will usually not exceed a value of 0.1 and frequently of 0.2 as a result of the preparation.

In a particularly preferred embodiment, therefore, in the compounds of the formula I, less than 10% of the nitrogen atoms are in the form of aminic NH groups or $NH_2$ groups. If the compounds I are used in the form of mixtures, then it is the average number of aminic groups per molecule. In this embodiment, the compounds are thus essentially free from aminic NH groups or $NH_2$ groups.

In another preferred embodiment of the present invention, component b) is a composition obtainable by reacting at least one compound of the formula I, which has at least one, e.g. one, two or three, reactive functional groups RG, chosen from NH groups, $NH_2$ groups and OH groups, with a crosslinking compound V which is at least bifunctional toward the groups RG. As component b), it is of course also possible to use those compositions obtained by reacting a mixture of the compounds of the formula I, which on average has at least one, preferably 1 to 2 and in particular 1 to 1.5, of the abovementioned reactive groups RG, with the crosslinking compounds V.

Crosslinking compounds V are understood here and below as meaning those compounds which are at least bifunctional toward the reactive groups RG of compounds I, i.e. can react with at least two of the reactive groups RG to form bonds. Such compounds V usually have at least two reactive groups RG' and/or at least one bifunctional-reactive group RG" which are complementary to the abovementioned groups RG. Examples of reactive groups RG' are carboxyl groups, and the ester- and amide-forming derivatives thereof, such as anhydride, acid chloride, $CONH_2$, isocyanate and lower alkyl ester groups. Further examples of RG' are oxirane groups, and ethylenically unsaturated double bonds which are in conjugation relative to a carbonyl group. Examples of reactive functional groups RG" are the functional groups derived from carbonic acid, such as carbonate groups, urea groups, thiourea groups and the like.

Examples of suitable crosslinking compounds V are:
(1) derivatives of carbonic acid, such as ethylene carbonate, propylene carbonate, diethyl carbonate and urea;
(2) aliphatic and cycloaliphatic di-, tri- and tetracarboxylic acids, with preferably 2 to 20 carbon atoms, and in particular 4 to 10 carbon atoms, which may optionally also have 1 or 2 tertiary nitrogen atoms or oxygen atoms in the aliphatic or in the cycloaliphatic molecular moiety, e.g. oxalic acid, malonic acid, succinic acid, glutaric acid, adipic acid, pimelic acid, azelaic acid, suberic acid, sebacic acid, citric acid, propanetricarboxylic acid, ethylenediaminetetraacetic acid and butanetetracarboxylic acid, and the ester- and amide-forming derivatives of these carboxylic acids;
(3) α,β-ethylenically unsaturated mono-, di- and tricarboxylic acids with, preferably, 3 to 10 carbon atoms, such as acrylic acid, methacrylic acid, fumaric acid, maleic acid, itaconic acid and aconitic acid, and the ester- and amide-forming derivatives of these carboxylic acids;
(4) aromatic di-, tri- and tetracarboxylic acids, such as phthalic acid, isophthalic acid and terephthalic acid, and the ester- and amide-forming derivatives of these carboxylic acids;
(5) aliphatic, cycloaliphatic and aromatic di- or triisocyanates with, preferably, 4 to 20 carbon atoms, such as hexamethylene diisocyanate, isophorone diisocyanate, toluene diisocyanate, 2,2'-(4-isocyanatophenyl)propane;
(6) compounds with at least 2, e.g. 2, 3 or 4, glycidyl groups, e.g. glycidyl ethers of aliphatic, cycloaliphatic or aromatic alcohols with 2 to 4 OH groups and preferably 2 to 20 carbon atoms, e.g. glycidyl ethers of propanediol, butanediol, hexanediol, diethylene glycol, cyclohexanediol, 2,2-bis(p-hydroxyphenyl)propane, of low molecular weight novolaks, of trimethylolpropane, and the like.

Preferred compounds V are the compounds of the abovementioned groups (1) to (3). Particularly favorable performance properties are displayed by the reaction products of I with the di- or tricarboxylic acids of groups (2) and (3), and also α,β-monoethylenically unsaturated carboxylic acids, and in particular with fumaric acid or ester- or amide-forming derivatives thereof. Particular preference is also given to acrylic acid and the ester- or amide-forming derivatives thereof.

It is assumed that in the crosslinking compounds V of group (3) both the carboxyl groups and also the α,β-ethylenically unsaturated double bonds act as reactive groups RG', with the α,β-ethylenically unsaturated double bond reacting in the sense of a Michael reaction with the reactive functional groups RG of the compound I.

Preference is given to the reaction products of such compounds I or of mixtures of compounds I which on average have 1 to 2 and in particular 1.0 to 1.5 reactive groups RG in the molecule.

Preference is also given to reaction products of compounds I with compounds V of groups (2) to (4) which still have a small proportion of free carboxyl groups. These compounds have an acid number (given in mg of KOH per g of reaction product, in accordance with DIN 53402) which is usually not more than 60. These compositions frequently have an acid number in the range from 5 to 40 and in particular from 10 to 30.

Of the compounds of the formula I, preference is given to those compounds in which the variables A, B, $R^1$, $R^2$, X and Z in formula I themselves or preferably together have the following meanings:

A, B, independently of one another, are $C_2$–$C_4$-alkylene, $R^1$ is hydrogen or $[A^1\text{-}X^1]_m$—H, in which $A^1$ is $C_2$–$C_3$-alkylene and $X^1$ is oxygen or a group $NR^a$, in which $R^a$, independently of the others, is hydrogen or C(O)R, and m is a number from 1 to 10, in particular 1 or 2, $R^2$ is hydrogen or $[A^2\text{-}X^2]_n$—H, in which $A^2$ is $C_2$–$C_3$-alkylene and $X^2$ is oxygen or a group $NR^a$, in which $R^a$, independently of the others, is hydrogen or C(O)R, and n is a number from 1 to 10, in particular 1 or 2, $R^1$ forms a $C_2$–$C_4$-alkylene group with $R^2$, or $R^2$ forms a $C_2$–$C_4$-alkylene group with $R^3$, X is oxygen or a group N—$R^3$, in which $R^3$ has the following meanings: hydrogen or a group C(O)—R, Z is hydrogen or $[A^4\text{-}X^4]_q$—H, in which $A^4$ is $C_2$–$C_3$-alkylene and $X^4$ is oxygen or a group $NR^a$, in which $R^a$, independently of the others, is hydrogen or C(O)R, and q is a number from 1 to 10, in particular 1, 2, 3 or 4.

Of the compounds of the formula I, preference is also given to those compounds in which the group B—X-Z is hydrogen:

A is $C_5$–$C_{20}$-alkylene which is interrupted by one or two oxygen atoms which are nonadjacent to heteroatoms, $R^1$ is hydrogen or a group of the formula $[A^1\text{-}X^1]_m$—H, in which $A^1$ is $C_2$–$C_3$-alkylene and $X^1$ is oxygen or a group $NR^a$, in which $R^a$, independently of the others, is hydrogen or C(O)R, and m is a number from 1 to 10, preferably 1 or 2 and $R^2$ is hydrogen or a group C(O)—R.

Particularly preferred compounds of the formula I are described by the formulae I-A to I-H' listed below:

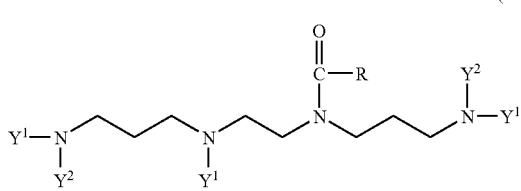
(I-A)

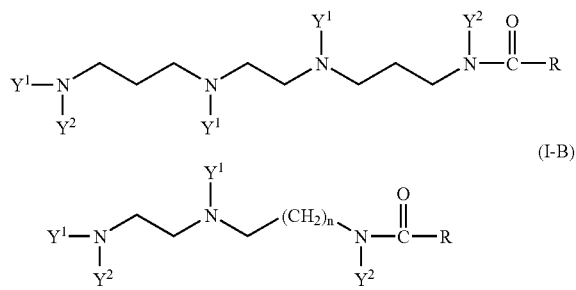
(I-A')
(I-B)
n = 1: I-B.1
n = 2: I-B.2
n = 3: I-B.3

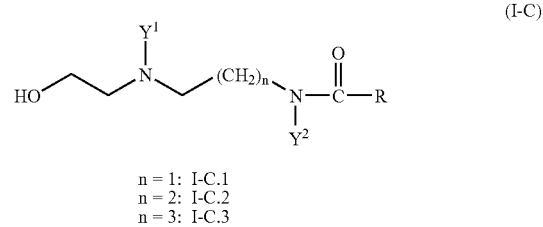
(I-C)
n = 1: I-C.1
n = 2: I-C.2
n = 3: I-C.3

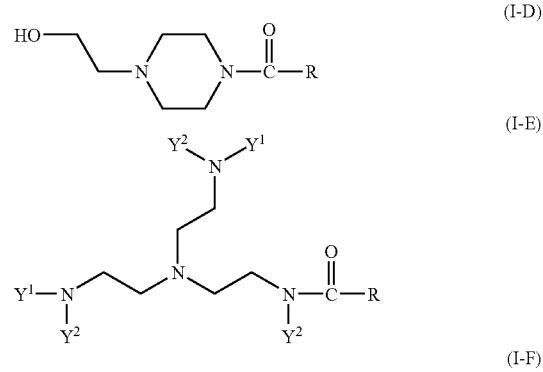
(I-D)
(I-E)

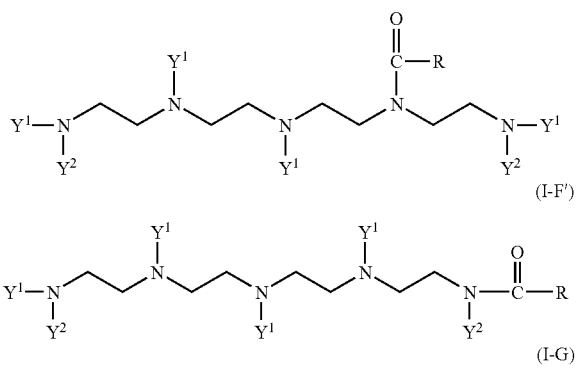
(I-F)
(I-F')

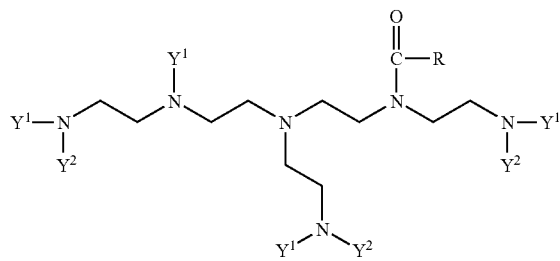
(I-G)

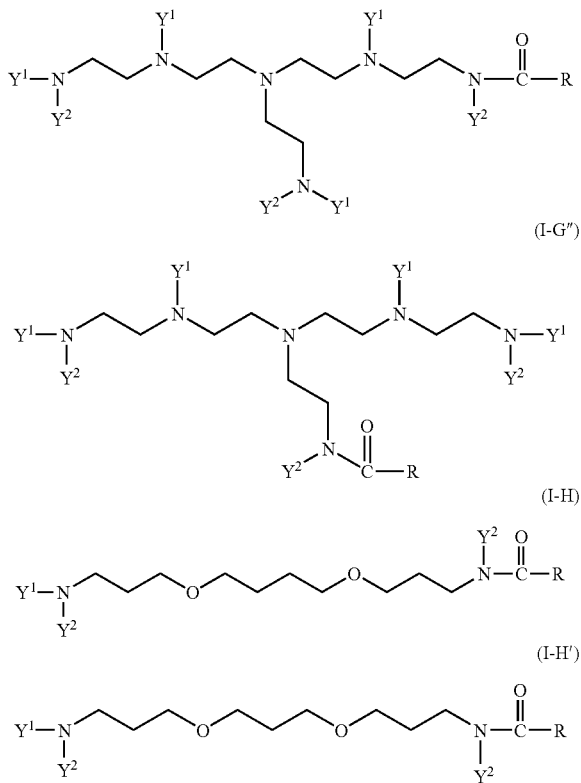

(I-G')

(I-G")

(I-H)

(I-H')

Herein, $Y^1$, independently of one another, are hydrogen, a group $[CH_2—CH_2—O]_kH$, a group $[CH_2—CH_2—O]_kC(O)R$ or a group $C(O)—R$, in which R has the meaning given above. $Y^2$, independently of the others, is hydrogen, a group $[CH_2—CH_2—O]_kH$ or a group $[CH_2—CH_2—O]_kC(O)R$, where k is 1 or 2.

Of the compounds I-A to I-H', particular preference is given to those compounds in which, on average, less than 10% of the groups $Y^1$ are hydrogen, i.e. these compounds have an amine number below 2 and in particular of no more than 1. Particular preference is given to those compounds I-A to I-H' in which at least 90% of the groups $Y^1$ are a group $C(O)R$. $Y^2$ is then preferably hydrogen. Also particularly preferred are those compounds I-A to I-H' with amine numbers below 2 and in particular up to at most 1, in which some of the groups $Y^1$ and/or $Y^2$ are radicals $[CH_2CH_2—O]_k$—H or $[CH_2CH_2—O]_k$—C(O)R, the remaining groups $Y^1$ are radicals C(O)R and the remaining groups $Y^2$ are hydrogen. In these compounds, the molar ratio of $CH_2$—$CH_2$—O units to nitrogen atoms is preferably 1:5 to 2:1. Of the abovementioned compounds I-A to I-H', very particular preference is given to the compounds of the formulae I-A, I-A' and I-B.

Particular preference is also given to the reaction products of compounds of the formulae I-A to I-H', in particular of the compounds I-B which still have at least one, preferably 1 to 2, reactive groups RG, with the abovementioned crosslinking compounds V, preferably with the carboxyl-containing crosslinkers V of groups (2) and (3) given as preferred, or with the ester-/amide-forming derivatives thereof, in particular with α,β-ethylenically unsaturated mono-, di- and tricarboxylic acids and particularly preferably with fumaric acid or acrylic acid. Also preferred are the reaction products of mixtures of the compounds I-A to I-H', in particular a mixture of two compounds I-B, which have on average 1 to 2 reactive groups RG, in particular 1.0 to 1.5, reactive groups RG. In particular, the reaction products have the abovementioned amine numbers. The acid number of these reaction products is preferably likewise in the abovementioned ranges, e.g. in the range from 5 to 40.

The amide compounds I are usually prepared by reacting amines of the formula II

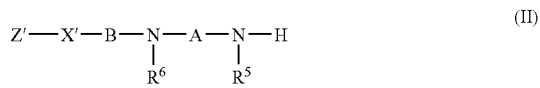

(II)

with a long-chain carboxylic acid of the formula R—COOH or an amide- or ester-forming derivative of this carboxylic acid, where R has the meanings given above. In formula II, the variables $R^5$, $R^6$, A, B, X' and Z' have the following meanings:

A, B, independently of one another, are $C_2$–$C_{20}$-alkylene which may optionally have 1 or 2 OH groups, 1 or 2 double and/or triple bonds and/or be interrupted by one, two or three oxygen atoms which are nonadjacent to heteroatoms, or $C_5$–$C_{20}$-cycloalkylene which may optionally be substituted by 1 or 2 OH groups and/or by 1, 2, 3 or 4 methyl groups and/or may have a carbonyl function as ring member, $R^5$ is hydrogen, $C_1$–$C_{13}$-alkyl, $C_5$–$C_{10}$-cycloalkyl, phenyl or a group of the formula $[A^5\text{-}X^5]_r$—H, $R^6$ is hydrogen, $C_1$–$C_{13}$-alkyl, $C_5$–$C_{10}$-cycloalkyl, phenyl or a group of the formula $[A^6\text{-}X^6]_s$—H, X' is oxygen or a group N—$R^7$, in which $R^7$ has the following meanings: hydrogen, a group C(O)—R or a group of the formula $[A^7\text{-}X^7]_t$—H, Z' is hydrogen or a group $[A^8\text{-}X^8]_u$—H, in which $A^5$, $A^6$, $A^7$, $A^8$, independently of one another, are $C_2$–$C_3$-alkylene, $X^5$, $X^6$, $X^7$, $X^8$, independently of one another, are oxygen or a group $NR^b$ in which $R^b$ is hydrogen, $CH_2CH_2NH_2$ or $CH_2CH_2CH_2NH_2$, and r and u, independently of one another, are a number from 0 to 21, s and t, independently of one another, are a number from 0 to 11, where $R^5$ with $R^6$ or $R^6$ with $R^7$ and/or any two radicals $R^7$, $R^8$, $R^b$ which are bonded to two nitrogen atoms bonded via an alkylene unit may also be $C_1$–$C_4$-alkylene which may have a carbonyl function and/or may be substituted by 1, 2 or 3 methyl groups, or the group Z'-X'-B is hydrogen if A is $C_6$–$C_{20}$-alkylene which is interrupted by one, two or three oxygen atoms which are nonadjacent to heteroatoms, or is $C_5$–$C_{20}$-cycloalkylene which may optionally be substituted by 1 or 2 OH groups and/or by 1, 2, 3 or 4 methyl groups and/or may have a carbonyl function as ring member.

With regard to preferred meanings of the variables A, B in formula II, what is stated above for the compounds of the formula I applies accordingly. Preferred meanings of the variables $R^5$, $R^6$, X' and Z' are:

$R^5$ is hydrogen or a group of the formula $[A^5\text{-}X^5]_r$—H, in which $A^5$ is $C_2$–$C_3$-alkylene and $X^5$ is oxygen or NH, and r is a number from 1 to 10, in particular 1 or 2, $R^6$ is hydrogen, $[A^6\text{-}X^6]_s$—H, in which $A^6$ is $C_2$–$C_3$-alkylene and $X^6$ is oxygen or NH, and s is a number from 1 to 10 and in particular 1 or 2, or $R^5$ forms a $C_2$–$C_4$-alkylene group with $R^6$, or $R^6$ forms a $C_2$–$C_4$-alkylene group with $R^7$, X' is oxygen or a group N—$R^7$, in which $R^7$ is hydrogen, Z' is hydrogen or a group $[A^8$-$X^8]_u$—H, in which $A^8$ is $C_2$–$C_3$-alkylene and $X^8$ is oxygen or NH, and u is a number from 1 to 10, in particular 1, 2, 3 or 4.

Of the amines of the formula II, preference is given to those compounds in which the group Z'-X'-B is hydrogen and A is $C_5$–$C_{20}$-alkylene which is interrupted by one or two oxygen atoms which are nonadjacent to heteroatoms, $R^5$ is hydrogen or a group of the formula $[A^5$-$X^5]_r$—H, in which $A^5$ is $C_2$–$C_3$-alkylene and $X^5$ is oxygen or NH, and r is a number from 1 to 10, in particular 1 or 2 and $R^2$ is hydrogen.

Examples of preferred amines II are the amines of the formulae II-A to II-H':

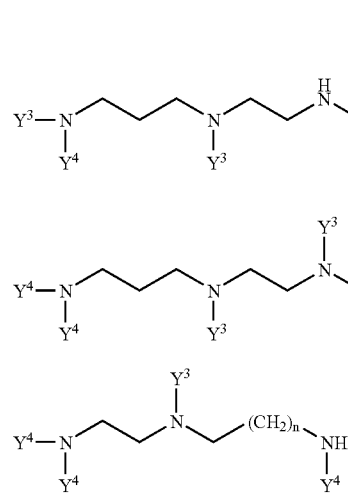

n = 1: II-B.1
n = 2: II-B.2
n = 3: II-B.3

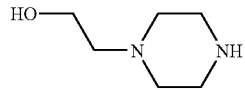

n = 1: II-C.1
n = 2: II-C.2
n = 3: II-C.3

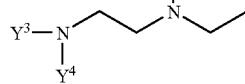

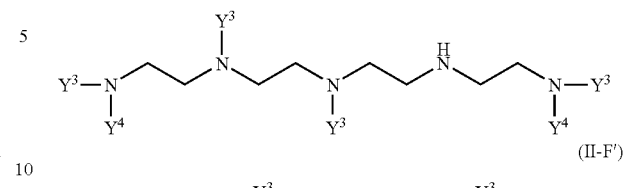

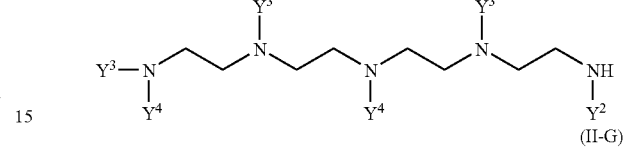

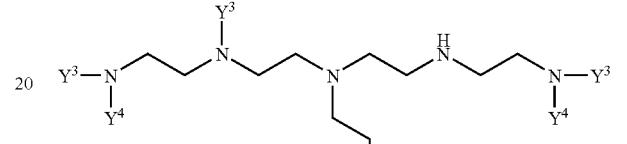

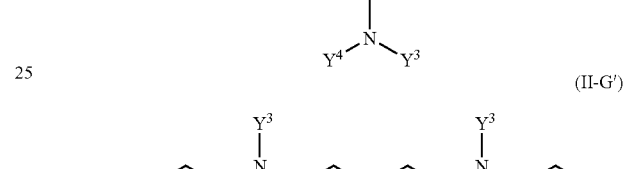

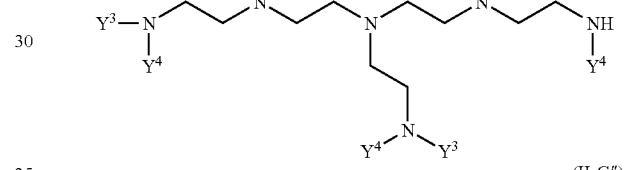

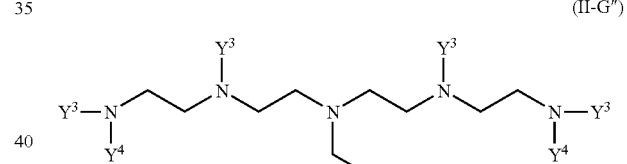

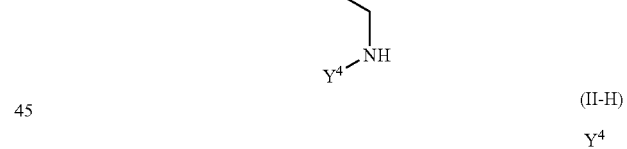

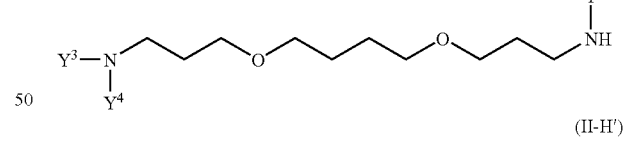

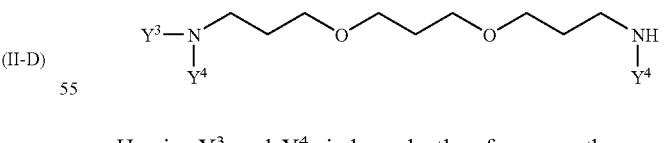

Herein, $Y^3$ and $Y^4$, independently of one another, are hydrogen or a group $[CH_2$—$CH_2$—$O]_k$H, in which k has the abovementioned meaning. In particular, at least one of the variables $Y^3$ and $Y^4$ is hydrogen, especially at least 2 are hydrogen and particularly preferably all of the variables $Y^3$ and $Y^4$ are hydrogen.

Suitable amide- or ester-forming derivatives of the carboxylic acids R—COOH are anhydrides thereof, e.g. mixed anhydrides thereof with formic acid, methyl and ethyl esters thereof, and acid chlorides thereof.

To prepare the compounds I, the amines II are reacted with the respective carboxylic acid or a mixture of carboxylic acids or with the amide-forming derivatives thereof under customary amidation conditions. The molar ratio of carboxylic acid to aminic NH or $NH_2$ groups in II is usually in the range from 0.1:1 to about 1.1:1, preferably in the range from 0.4:1 to 1.05:1 and in particular in the range from 0.6:1 to 1:1.

The carboxylic acid, or its derivative, and the compound II are often used in a molar ratio which corresponds to the stoichiometry of the desired compound I, deviations from the desired stoichiometry of up to 20%, preferably up to 10%, based on the desired molar ratio being unproblematical. If virtually complete amidation of the compound I is desired, the molar ratio of carboxylic acid to aminic nitrogens is usually in the range from 0.8:1 to about 1:1.1, and in particular in the range from 0.9:1 to about 1:1. If esterification of the optionally present OH groups is also desired, the amount of carboxylic acid or derivative thereof is of course greater, and may usually be up to 1.1 equivalent, based on the sum of all OH, NH and $NH_2$ groups in II.

The amine II will often be reacted with the carboxylic acid itself. The reaction can be carried out either in a solvent or without a diluent, the latter procedure being preferred.

If the reaction is carried out in a solvent, an organic solvent is preferably chosen which is suitable as entrainer for the water formed during the reaction, e.g. benzene, toluene, ethylbenzene, xylenes, and aliphatic and cycloaliphatic solvents and mixtures thereof.

The amidation of II is often carried out with an amidation catalyst suitable for the reactants. If the reaction of II is carried out with a carboxylic acid, an anhydride or an ester, then an acid is typically used, e.g. an inorganic acid, such as phosphoric acid, phosphorous acid, hypophosphorous acid, sulfuric acid, an organic sulfonic acid, such as p-toluenesulfonic acid, benzenesulfonic acid or naphthalenesulfonic acid, compounds of tetravalent titanium, tin or zirconium, in particular oxides and alkoxides thereof or mixtures of these acids as amidation catalyst. The catalyst acid is preferably used in an amount of from 0.1 to 5% by weight and in particular in an amount of from 0.2 to 2% by weight, based on the total weight of the feed substances. The reaction of II with the carboxylic acid is preferably carried out in the presence of hypophosphorous acid or a mixture of hypophosphorous acid and an organic sulfonic acid in a quantitative ratio from 10:1 to 1:10.

The amidation can be carried out in accordance with another variant also without the addition of an amidation catalyst.

The reaction temperatures required for the reaction naturally depend on the reactivity of the acid or of the acid derivative and are generally in the range from 30° C. to 250° C. and preferably in the range from 100° C. to 200° C. and specifically in the range from 120° C. to 180° C. The reaction time is usually at least 1 h, preferably 2 to 20 h and in particular 3 to 15 h.

In the reaction of the amines II with the carboxylic acid R—COOH, the compounds I form, depending on the stoichiometry chosen, in uniform form or in the form of mixtures with a varying degree of amidation and/or in the form of isomer mixtures. To use the compounds I in the dispersions according to the invention, it is not usually necessary to separate the mixture into the individual compounds I. However, the person skilled in the art can undertake such a separation using customary methods, e.g. chromatographic methods, if this is desired. Frequently, however, separation of the reaction mixture will be dispensed with and the waxlike mixtures of compounds I obtained in the reaction will be used directly as component b) in the dispersions according to the invention.

Accordingly, a preferred embodiment of the invention relates to those dispersions which comprise, as component b), a composition which is obtainable by at least 20%, preferably at least 40% and preferably at least 60%, amidation of the aminic NH or $NH_2$ groups of amines of the formula II with a carboxylic acid R—COOH (or with the amide-forming derivative thereof). The degree of amidation in % is understood as meaning the proportion of the aminic NH or $NH_2$ groups of II which have been amidated, i.e. converted into a group N—C(O)—R or into a group NH—C(O)—R. The degree of amidation usually corresponds to the molar ratio of carboxylic acid R—COOH (or derivative thereof) to the number of NH or $NH_2$ groups of II. Component b) is particularly preferably a composition with a degree of amidation of at least 80% and in particular of at least 90%. The amine number of these reaction. products is preferably in the abovementioned ranges. These reaction products preferably comprise only a small amount of or no free carboxylic acids R—C(O)OH or derivatives thereof. In particular, the reaction is carried out until more than 90% and in particular more than 95% of the carboxylic acid R—C(O)OH used or its amide-forming derivative are reacted. The acid number of such mixtures will therefore preferably not exceed a value of 10.

In this embodiment of the invention, the amidation products of amines II-A to II-H' are particularly preferred. Of these, particular preference is given to the reaction products of those amines II-A to II-H' in which all substituents $Y^3$ and $Y^4$ are hydrogen, and also the reaction products of those amines II-A to II-H' in which some of the substituents $Y^3$ and/or $Y^4$ are radicals $[CH_2CH_2—O]_k$—H, and the molar ratio of $CH_2CH_2$—O units to nitrogen atoms is in the range from 1:5 to 2:1. Among the abovementioned reaction products, very particular preference is given to the reaction products of the amines II-A, II-A' and II-B.

A further embodiment of the invention encompasses those dispersions whose component b) is obtainable by partial amidation of an amine II, which is preferably chosen from the amines II-A to II-H', in particular of an amine II-B and especially diethylenetriamine and subsequent reaction of the resulting compound I which still has reactive groups RG with an at least bifunctional crosslinker V. With regard to the preferred crosslinkers, that stated above is applicable. In particular, fumaric acid is preferred as crosslinker.

The amidation is preferably carried out in the first step until the compounds I obtained therein, or mixtures thereof, have, on average, 1 to 2 and in particular 1 to 1.5 of the abovementioned reactive groups RG, in particular NH or $NH_2$ groups, per molecule. The number of free reactive groups RG can be controlled by the person skilled in the art in a known manner via the stoichiometry of amine II to carboxylic acid RCOOH or its amide-forming derivative. The person skilled in the art may also preferably pay attention to an at least 90% conversion, in particular an at least 95% conversion, of the acid component RCOOH.

Subsequent reaction with the at least bifunctional crosslinker V is usually carried out under the reaction conditions customary for the reaction of the crosslinker with the abovementioned reactive groups RG, and preferably under the reaction conditions given for the amidation.

The amount of crosslinker V is usually chosen so that a product with the lowest possible average acid number, preferably an acid number of less than 50 and in particular less than 40 results. For this purpose, the crosslinker V will be used in an amount so that the molar ratio of reactive groups RG to functionality F of the crosslinker, i.e. the molar ratio RG:F, is in the range from 0.9:1 to 1:2 and preferably in the range from 0.9:1 to about 1:1.8. In this connection, it should be taken into consideration that α,β-ethylenically unsaturated carboxylic acids can react with the reactive groups RG both via the carboxyl groups and also via the ethylenically unsaturated double bond. Accordingly, an α,β-ethylenically unsaturated monocarboxylic acid has a functionality of 2, and an α,β-ethylenically unsaturated dicarboxylic acid has a functionality of 3.

In a very preferred embodiment of the present invention, the component b) used is a composition obtainable by i) reaction of an amine of the formula IIb, in particular of an amine IIb in which $Y^3$ and $Y^4$ are hydrogen, with a carboxylic acid R—COOH or with an amide-forming derivative thereof, in particular behenic acid, in the molar ratio of from 1:0.8 to 1:2 (amine II-B to carboxylic acid), in particular 1:1 to 1:1.8 and ii) subsequent reaction of the reaction product obtained in step i) with fumaric acid. The molar ratio of fumaric acid to the amine IIb used in step i) is preferably in the range from 1:1 to 1:3 and in particular in the range from 1:1.5 to 1:2.5.

With regard to the reaction conditions in steps i) and ii), that stated above is applicable.

In a further embodiment of the present invention, a reaction product of an amino-carrying polymer and at least one carboxylic acid R—COOH is used as component b).

A further embodiment of the present invention relates to antifoam compositions whose component b) comprises an amidine compound of the formula Ia and/or reaction product thereof with a crosslinking compound V. Amidine compounds of the formula Ia are obtainable by thermolysis of compounds of the formula I in which $R^1$ and $R^2$ are hydrogen. The thermolysis usually takes place at temperatures ≧180° C., preferably in the range from 180° C. to 220° C. The reaction can be carried out in a high-boiling solvent, e.g. one of the solvents specified for the amidation, and takes place in particular without a diluent, i.e. in the absence of a solvent. The reaction of the amide compounds I to the amidine compounds Ia preferably takes place with removal of the water which forms during the reaction. Processes for the preparation of amidine compounds Ia by intramolecular cyclization of amides are known, for example, from WO 00/11125. The methods described there can also be used for the preparation of the amidine compounds Ia. For the preparation of the amidine compounds, preference is given to using a reaction mixture which has been obtained in the preparation of the amide compound I.

Preferred amidine compounds are those obtainable by thermolysis of I-A, I-A', I-B, I-C, I-F, I-F', I-G and/or I-G', in particular of those of the abovementioned amides in which at least $Y^2$ on the amide nitrogen and $Y^1$ on the amine nitrogen adjacent to the amide nitrogen, in particular all $Y^1$ and $Y^2$, are hydrogen. Also preferred are, in particular, the reaction products of these amidine compounds Ia with crosslinkers V, in particular with fumaric acid and/or acrylic acid.

Among the amidine compounds Ia, particular preference is given to the amidine compounds obtained by reacting I-B, in particular I-B.1, and the products obtained by reacting these amidine compounds Ia with crosslinkers V, in particular with acrylic acid and/or fumaric acid, specifically when all $Y^1$ and $Y^2$ are hydrogen. With regard to the reaction of the amidine compounds Ia with crosslinkers V, that stated for the reaction of amides I with crosslinkers V is applicable.

Suitable amino-carrying polymers are chosen from polyethylene-imines, polyvinylamines, polyallylamines, polylysines, polyamidoamines, which are optionally grafted with ethyleneimine, and dicyanodiamide-formaldehyde resins, and the reaction products of these polymers with $C_2$–$C_4$-alkylene oxides. Such polymers are known to the person skilled in the art and are commercially available. Preference is given to the reaction products of those polymers whose molecular weight is below 5000 daltons and, in particular, in the range from 300 to 2000 daltons (number-average molecular weight). The reaction products of polyethyleneimines are preferred.

Reaction of amino-containing polymers with the carboxylic acids R—COOH takes place analogously to the preparation of the compounds I from the amines II by reaction with a carboxylic acid R—COOH or an amide-forming derivative thereof under the abovementioned reaction conditions. The degree of amidation of these polymers is preferably in the range from 20 to 100%, preferably 40 to 100%, in particular 60 to 100% and particularly preferably 80 to 100%. Such amidation products of amino-containing polymers are known from the prior art, e.g. from EP-A-0 336 901 and DE-A 19900458.

In addition to component b), which generally constitutes 1 to 30% by weight, preferably 3 to 20% by weight and in particular 5 to 15% by weight, of the oil phase, the compositions according to the invention comprise, as main constituent, the water-insoluble oxygen-containing organic substance which is solid at room temperature and which was mentioned at the beginning. The proportion of this substance is generally 50 to 99% by weight, preferably 60 to 97% by weight and in particular 70 to 95% by weight, based on the total weight of the oil phase.

Component a) preferably has a melting point of at least 30° C., in particular of at least 40° C. and particularly preferably at least 50° C. The melting point will generally not exceed a value of 90° C. and preferably 80° C.

Examples of suitable substances of component a) are naturally occurring or synthetically prepared alcohols with at least 12 carbon atoms in the molecule. Examples of such alcohols are native alcohols (fatty alcohols), such as myristyl alcohol, cetyl alcohol, stearryl alcohol, palmityl alcohol, tallow fatty alcohol and behenyl alcohol, and synthetically prepared alcohols, for example the saturated, straight-chain, unbranched alcohols obtainable by the Ziegler process by oxidation of aluminum alkyls, and synthetic alcohols obtainable by oxo synthesis. The latter are usually alcohol mixtures which contain up to 48 carbon atoms in the molecule. Very effective antifoams comprise, for example, mixtures of at least one $C_{12}$- to $C_{26}$-alcohol and at least one fatty alcohol with 28 to 48 carbon atoms in the molecule, cf. EP-A-0 322 830.

In place of the pure alcohols, it is also possible to use, as component a), distillation residues which are obtainable in the preparation of alcohols with a relatively high carbon number by oxo synthesis or by the Ziegler process. Further compounds which are suitable as constituent of component a) are alkoxylated alcohols, and alkoxylated distillation residues which are produced during the preparation of alcohols by oxo synthesis or according to the Ziegler process. The alkoxylated compounds are obtainable by reacting the long-chain alcohols or distillation residues with ethylene oxide or with propylene oxide or else with a mixture of ethylene oxide and propylene oxide. Here, ethylene oxide can firstly be added onto the alcohols or the distillation residues, followed by propylene oxide, or propylene oxide is added first and then ethylene oxide. Up to 5 mol of ethylene oxide and propylene oxide are in most cases added per OH group of the alcohol. From the group of alkoxylated compounds, particular preference is given to those reaction products which are prepared by the addition of 1 or 2 mol of ethylene oxide onto 1 mol of fatty alcohol or distillation residue.

The long-chain alcohols which are suitable as component a) also include 3-thiaalkan-1-ols, the S-oxides thereof and S-dioxides thereof—compounds of the formula III):

$$Kw\text{-}CH_2\text{—}S(O)_v\text{—}CHR^9\text{—}CHR^{10}\text{—}OH \qquad (III)$$

in which Kw is an alkyl radical having 9 to 35, preferably 11 to 29, carbon atoms, $R^9$ and $R^{10}$, independently of one another, are hydrogen, methyl, ethyl or phenyl, and v is 0, 1 or 2. Kw is preferably a linear alkyl radical. $R^9$ and $R^{10}$ are, in particular, H.

The compounds of the formula III are known to the person skilled in the art. They are obtained by reacting α-olefins with mercapto alcohols and optionally subsequently oxidizing the thiaalkanols obtained therein. The addition of the thiol function of the mercapto alcohols takes place in the presence of oxygen or compounds which form free radicals under the reaction conditions (e.g. 80 to 120° C.), such as peroxides, hydroperoxides or azo compounds, such as azobisisobutyronitrile. The addition of the thioalkanols onto a-olefins proceeds free-radically with anti-Markovnikov orientation, cf. Angew. Chem., vol. 82, 276–290 (1970), in accordance with the following scheme:

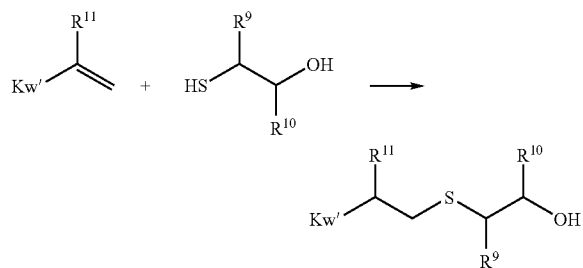

where Kw' is $C_8$–$C_{34}$-alkyl, which is preferably linear, $R^{11}$ is H or $C_1$–$C_5$-alkyl, preferably H or $CH_3$, and $R^9$, $R^{10}$ have the meanings given above.

Compounds of the formula III are known from the prior art, e.g. from U.S. Pat. No. 4,040,781, U.S. Pat. No. 4,031,023 and WO 00/44470.

The 3-thiaoxoalkan-1-ols give, by oxidation for example with hydrogen peroxide, $PhICl_2$, $NaIO_4$, t-BuOCl, potassium permanganate, tungstic acids or peracids (e.g. peracetic acid or perbenzoic acid), the corresponding 3-thiaoxoalkan-1-ols.

3-Thiadioxoalkan-1-ols are likewise obtainable from the 3-thiaalkan-1-ols by oxidation with said oxidizing agent, although the process is carried out under different reaction conditions, e.g. the concentration of the oxidizing agent and the temperature at which the oxidation is carried out are increased.

Substances suitable as component a) further include mono-, di- and triglycerides of fatty acids, e.g. of $C_{12}$- to $C_{22}$-carboxylic acids. The fatty acids on which these glycerides are based are, for example, lauric acid, myristic acid, palmitic acid, stearic acid, arachidic acid and particularly preferably behenic acid. Preference is given to the mono-, di- and in particular the triglycerides of palmitic acid and/or of stearic acid. Also suitable are the esters of the fatty acids with $C_1$- to $C_{11}$-alcohols, e.g. with methanol, ethanol, propanol, butanol, hexanol or decanol, and also ester waxes, i.e. esters of fatty acid with aliphatic alcohols which have at least 12 carbon atoms, e.g. the fatty acid esters of the abovementioned fatty alcohols, of the abovementioned synthetic alcohols and of the abovementioned thiaalkanols.

Component a) preferably comprises at least one of the abovementioned long-chain alcohols with at least 12 carbon atoms as component a1) and optionally substances a) different therefrom as component a2). This alcohol preferably forms the main constituent of component a) and constitutes, in particular, 55 to 100% by weight of component a). Accordingly, the proportion of component a2) in component a) is in the range from 0 to 50% by weight, e.g. in the range from 1 to 50% by weight and preferably in the range from 5 to 45% by weight, in particular in the range from 10 to 40% by weight.

In a preferred embodiment of the dispersions according to the invention, the constituent a1) is chosen from native and synthetic alkanols, in particular from fatty alcohols with 12 to 30 carbon atoms. In another preferred embodiment, the constituent a2) is chosen from the compounds of the formula III, in particular the 3-thiaalkanols IIIa (v=0).

As additional component a2), component a) preferably comprises at least one mono-, di- and/or triglyceride of a fatty acid, in particular a triglyceride. The proportion of mono-, di- and/or triglyceride is preferably less than 50% by weight, in particular less than 45% by weight, e.g. 5 to 45% by weight and in particular 10 to 40% by weight of component a).

In place of or together with the mono-, di- or triglyceride, the component a) can comprise, as additional component a2), a fatty acid ester of a $C_1$–$C_{11}$-alcohol and/or of an aliphatic alcohol with at least 12 carbon atoms. The proportion of fatty acid ester is preferably less than 50% by weight, in particular less than 45% by weight, e.g. 5 to 45% by weight and in particular 10 to 40% by weight of component a).

Suitable as further optional component c) of the oil phase are, in principle, those compounds and substances which are known to improve the effectiveness of antifoam compositions based on oil-in-water dispersions. In the compositions according to the invention, their proportion in the oil phase is usually not more than 20% by weight and in particular not more than 10% by weight, e.g. 0.1 to 20% by weight and in particular 0.5 to 10% by weight. The total amount of component a) and b) is preferably not more than 20% by weight and in particular not more than 18% by weight of the oil phase. The weight ratio of component a):c) is preferably above 1:1 and in particular above 2:1.

As component c), mention is made in particular of polyglycerol esters which are obtainable by partial or complete esterification of the OH groups of oligo- or polyglycerols with at least one aliphatic $C_{12}$–$C_{35}$-carboxylic acid. The polyglycerols on which the esters are based are esterified until compounds arise which are virtually no longer soluble in water. The polyglycerols are obtained, for example, by alkaline-catalyzed condensation of glycerol at relatively high temperatures or by reaction of epichlorohydrin with glycerol in the presence of acidic catalysts. The polyglycerols usually comprise at least 2 to about 30, preferably 2 to 12, glycerol units. Commercially available polyglycerols comprise mixtures of polymeric glycerols, e.g. mixtures of diglycerol, triglycerol, tetraglycerol, pentaglycerol and hexaglycerol and optionally polyglycerols with high degrees of condensation. The degree of esterification of the OH groups of the polyglycerols is at least 20 and up to 100%, preferably 60 to 100%. The long-chain fatty acids used for the esterification may be saturated or else ethylenically unsaturated. Suitable fatty acids are, for example, lauric acid, myristic acid, palmitic acid, stearic acid, arachidic acid, behenic acid, oleic acid, hexadecenoic acids, elaidic acid, eicosenoic acids, docosenoic acids, such as erucic acid, behenic acid being particularly preferred, and polyunsaturated acids, such as octadecenedienoic acids and octatrienic acids, e.g. linoleic acid and linolenic acid, and mixtures of said carboxylic acids. Esters of polyglycerols suitable as antifoam component are described, for example, in EP-A-0 662 172 and EP 531 713.

In a preferred embodiment of the aqueous dispersions according to the invention, the fatty phase comprises at least one long-chain alcohol with an aliphatic hydrocarbon radical having at least 12 carbon atoms, which may be interrupted by a S atom or a group SO or $SO_2$, as component a) and at least one component c), chosen from the substances given above which are obtainable by at least 20% esterification of the OH groups of oligo- or polyglycerols with at least one aliphatic $C_{12}$–$C_{35}$-carboxylic acid, in particular behenic acid. The proportion of component c) in the fatty phase will here preferably not exceed 20% by weight, in particular 30% by weight, and is preferably in the range from 0.1 to 20% by weight, in particular 0.5 to 10% by weight, in each case based on the total weight of the fatty phase.

Also suitable as component c) are esters of a sugar alcohol with at least 4 OH groups or at least 2 OH groups and at least one intramolecular ether bond and a fatty acid with at least 20 carbon atoms in the molecule in the molar ratio $\geq 1:1$, where the free OH groups of these esters are optionally partially or completely esterified with $C_{12}$- to $C_{18}$-carboxylic acids. Preference is given to using esters of tetritols, pentitols and/or hexitols with fatty acids having at least 22 carbon atoms in the molar ratio $\geq 1:1.9$. Particular preference is given to using esters of mannitol and/or sorbitol with behenic acid in the molar ratio of $\geq 1:1$, preferably $\geq 1:1.9$. Apart from the suitable sugar alcohols sorbitol and mannitol, adonitol, arabitol, xylitol, dulcitol, pentaerythritol, sorbitan and erythritol are suitable. Sugar alcohols are understood as meaning the polyhydroxy compounds which form from monosaccharides as a result of reduction of the carbonyl function which are not sugars themselves. It is also possible to use the anhydro compounds which form from sugar alcohols as a result of intramolecular elimination of water. The esters of the sugar alcohols with $C_{22}$- to $C_{30}$-fatty acids are particularly effective. If the sugar alcohols are esterified only partially with a fatty acid containing at least 20 carbon atoms, the unesterified OH groups of the sugar alcohol can be esterified with another carboxylic acid, e.g. a $C_{12}$- to $C_{18}$-carboxylic acid. Esters of this type are described in EP A-0 732 134, to which reference is made for further details.

Also suitable as component c) are ketones with melting points above 45° C. They are in most cases used together with fatty alcohols whose melting points are at temperatures above 40° C. For further details relating to these compounds, reference is made to EP-A 696224.

Substances of component c) which are to be mentioned are also polyethylene waxes with a molar mass of at least 2000, and natural waxes such as beeswax or carnauba wax.

A further optional constituent d) of the compositions according to the invention are hydrocarbons with a boiling point above 200° C. (determined at atmospheric pressure). Preferred hydrocarbons are paraffin oils, e.g. the commercially available paraffin mixtures which are also referred to as white oil. Paraffins whose melting point is, for example, above 50° C. are also suitable. The proportion of component d) in the oil phase of the dispersions according to the invention is generally in the range from 0 to 15% by weight, e.g. from 1 to 10% by weight, in particular in the range from 1 to 5% by weight, based on the total weight of the oil phase.

The proportion of the oil phase, i.e. the total amount of components a) to d), in the aqueous dispersion can be up to 60% by weight and is preferably in the range from 5 to 50% by weight and in particular in the range from 10 to 40% by weight.

The fatty particles (oil phase) of the aqueous dispersions according to the invention generally have, on average, particle sizes in the range from 0.5 μm to 10 μm. The average particle size is understood here as meaning the weight or volume average of the respective distribution of the particle size in a dispersion according to the invention, as can be determined, for example, by dynamic or quasielastic light scattering or Fraunhofer diffraction of a dilute sample of the dispersion (see H. Wiese in D. Distler, wässrige Polymerdispersionen [aqueous polymer dispersions], Wiley-VCH, Weinheim 1999, p. 40 ff and literature cited therein, and H. Wiese, GIT-Fachz. Lab. 1992, p. 385–389, 762–768, 1029–1033). For stability reasons, preference is usually given to extremely finely divided dispersions in order to avoid creaming of the dispersions. It has been found that the antifoaming/deaerating action of the dispersions according to the invention depends on the particle size of the fatty particles. The activity optimum in each case can be determined by the person skilled in the art using simple experimental series, it being possible to establish the particle size during the preparation of the dispersion in a known manner. Measures to establish the average particle size are, for example, variation of the emulsifier concentration, variation of the type of emulsifier, concentration and nature of the thickener, and also the pressure during homogenization.

The dispersions according to the invention can comprise, as further disperse constituent, in addition to the oil phase, finely divided, virtually water-insoluble, inert solids with particle sizes of <20 μm, preferably 0.1 to 10 μm, in an amount of, for example, 0.1 to 50%, preferably 1 to 35%, of the weight of the oil phase of the oil-in-water dispersions. Suitable inert solids are, for example, kaolin, chalk, bentonite, talc, barium sulfate, silicon dioxide, zeolites, urea-formaldehyde pigments, melamine-formaldehyde pigments and microcrystalline cellulose, where the inert inorganic pigments may also be hydrophobicized, e.g. by treatment with trialkylsilyl halides.

To stabilize the oil phase in the aqueous dispersion, the compositions according to the invention advantageously comprise at least one surface-active substance. Suitable surface-active substances are, in principle, all substances known for the stabilization of hydrophobic particles or droplets in aqueous systems, e.g. anionic, cationic, amphoteric and/or nonionic emulsifiers, and water-soluble ionic and nonionic polymers, preferably ionically amphiphilic copolymers which have cationic or anionic groups and whose molecular weight, in contrast to the emulsifiers, is usually above 1000 daltons. Surface-active substances are sufficiently known to the person skilled in the art, e.g. from Ullmann's Encyclopedia of Industrial Chemistry, 5th ed., Vol. A9, p. 297–339.

Examples of suitable emulsifiers are: sodium and ammonium salts of higher fatty acids, of sulfated ethoxylation products onto $C_6$–$C_{22}$-alkylphenols, such as nonylphenol or octylphenol, of alkylarylsulfonates, of sulfonates of naphthalene, of naphthalenesulfonic acid formaldehyde or urea condensates, and of sulfosuccinates as anionic emulsifiers, and alkoxylated alkylphenols, oxyethylated unsaturated oils, such as reaction products from one mole of castor oil and 30 to 40 moles of ethylene oxide, and addition products of ethylene oxide and/or propylene oxide onto aliphatic alcohols having usually 12 to 20 carbon atoms, e.g. onto fatty alcohols, onto polyhydric alcohols, onto amines and onto carboxylic acids as nonionic emulsifiers.

Particularly effective anionic emulsifiers are the salts, preferably the sodium and the ammonium salts, of sulfonated $C_8$–$C_{22}$-alkyldiphenyl oxides, in particular of bis-sulfonated $C_8$–$C_{22}$-alkyldiphenyl oxides, such as bissulfonated dodecyldiphenyl oxide.

Examples of surface-active anionic polymers are homopolymers of acrylic acid, homopolymers of methacrylic acid, copolymers of acrylic acid and methacrylic acid in any desired molar ratio, copolymers of acrylic acid and maleic acid in any desired molar ratio, copolymers of methacrylic acid and maleic acid, polyvinylsulfonic acid, polyacrylamido-2-methylpropanesulfonic acid, styrenesulfonic acid or the alkali metal and ammonium salts of said polymers having molar masses of, for example, 1500 to 300 000. Preferred anionic surface-active polymers are amphiphilic copolymers containing acid groups and which comprise, in copolymerized form, (a) hydrophobic monoethylenically unsaturated monomers and
(b) monoethylenically unsaturated carboxylic acids, monoethylenically unsaturated sulfonic acids, monoethylenically unsaturated phosphonic acids or mixtures thereof, and optionally monomers (c) different therefrom, and also the salts, in particular the sodium and the ammonium salts.

Examples of hydrophobic monoethylenically unsaturated monomers are: styrene, methylstyrene, ethylstyrene, acrylonitrile, methacrylonitrile, $C_2$- to $C_{18}$-olefins, esters of monoethylenically unsaturated $C_3$- to $C_5$-carboxylic acids and monohydric alcohols, vinyl alkyl ethers, vinyl esters or mixtures thereof. From this group of monomers, preference is given to using isobutene, diisobutene, styrene and acrylates, such as ethyl acrylate, isopropyl acrylate, n-butyl acrylate and sec-butyl acrylate.

Examples of monomers (b) are: acrylic acid, methacrylic acid, maleic acid, maleic anhydride, fumaric acid, itaconic acid, vinylsulfonic acid, 2-acrylamidomethylpropanesulfonic acid, acrylamidopropane-3-sulfonic acid, 3-sulfopropyl acrylate, 3-sulfopropyl methacrylate, styrenesulfonic acid, vinylphosphonic acid or mixtures thereof in copolymerized form, where acrylic acid, methacrylic acid and maleic acid and its anhydride are preferred.

The molar mass of the amphiphilic copolymers is usually 1000 to 100 000 and is preferably in the range from 1500 to 10 000. The acid numbers of the anionic amphiphilic copolymers are usually 50 to 500, preferably 150 to 350 mg of KOH/g of polymer.

Particular preference is given to those antifoams and/or deaerators which have been stabilized with anionic amphiphilic copolymers which comprise, in copolymerized form, (a) 95 to 45% by weight of isobutene, diisobutene, styrene or mixtures thereof and
(b) 5 to 55% by weight of acrylic acid, methacrylic acid, maleic acid, monoesters of maleic acid or mixtures thereof and optionally up to 20% by weight of further monomers (c).

Particular preference is given to using copolymers which comprise, in copolymerized form, (a) 45 to 80% by weight of styrene,
(b) 55 to 20% by weight of acrylic acid and optionally up to 20% by weight of further monomers (c).

Suitable monomers (c) are water-soluble neutral, monoethylenically unsaturated monomers, e.g. the amides and the hydroxy-$C_2$–$C_4$-alkyl esters of the abovementioned ethylenically unsaturated carboxylic acids. The proportion of monomers (c), based on the total weight of all copolymerized monomers, is generally not more than 20% by weight, in particular not more than 10% by weight.

Suitable surface-active polymers for stabilizing the compositions according to the invention are also:
graft polymers of 5 to 40 parts by weight of N-vinylformamide and 100 parts by weight of a polyalkylene glycol with a molar mass of from 500 to 10 000,
zwitterionic polyalkylenepolyamines,
zwitterionic polyethyleneimines,
zwitterionic polyetherpolyamines or
zwitterionic crosslinked polyalkylenepolyamines.

Graft polymers of N-vinylformamide on polyalkylene glycols are described, for example, in WO-A-96/34903. The grafted vinylformamide units may optionally be up to 10% hydrolyzed. The proportion of grafted vinylformamide units is preferably 20 to 40% by weight, based on polyalkylene glycol. Preference is given to using polyethylene glycols with molar masses of from 2000 to 10 000.

Zwitterionic polyalkylenepolyamines and zwitterionic polyethyleneimines are known, for example, from EP-B 112592. Such compounds are obtainable, for example, by firstly alkoxylating a polyalkylenepolyamine or polyethyleneimine, e.g. with ethylene oxide, propylene oxide and/or butylene oxide, and then quaternizing the alkoxylation products, e.g. with methyl bromide or dimethyl sulfate, and then sulfating the quaternized alkoxylated products with chlorosulfonic acid or sulfur trioxide. The molar mass of the zwitterionic polyalkylenepolyamines is, for example, 1000 to 9000, preferably 1500 to 7500. The zwitterionic polyethyleneimines preferably have molar masses in the range from 2000 to 1700 daltons.

Zwitterionic polyetherpolyamines are obtainable, for example, by reacting, in a first reaction stage, linear or branched polyetherpolyamines with molar masses of from 100 to 800, which contain 2 to 10 nitrogen atoms and at least 2 primary or secondary amino end-groups, or the reaction products of said polyetherpolyamines with up to one mole of glycidol per NH group of the polyetherpolyamines with at least one $C_2$- to $C_4$-alkylene oxide or tetrahydrofuran in an amount so that 1 to 50 alkylene oxide units are added per NH group in the polyetherpolyamines. In a second process step, the alkoxylated polyetherpolyamines are reacted with a compound chosen from the group of halosulfonic acids, halophosphoric acids, vinylsulfonic acid, propanesulfone, haloacetic acids, acrylic acid, methacrylic acid, vinylphosphoric acid and the alkali metal or ammonium salts of said acids in a way such that at least one tertiary amine end-group of the alkoxylated polyetherpolyamines has 2 groups of the formulae

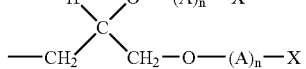

in which the variables A, n and X have the following meanings:
A is an ethylene oxide, propylene oxide, butylene oxide or tetrahydrofuran unit,
n is a number from 1 to 50,
X is a group of the formulae:

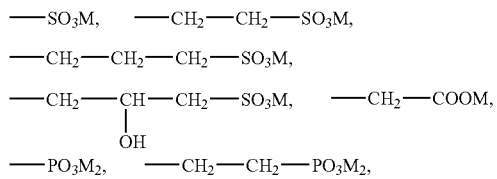

in which M is hydrogen, alkali metal or ammonium, where, in formula V, a substituent X may also be hydrogen.

At least one tertiary amino end-group of the alkoxylated polyetherpolyamines can, however, also comprise only one group of the formula IV or V and one group of the following groups:

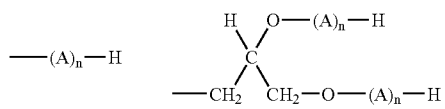

$C_1$- to $C_{22}$-alkyl or $C_7$- to $C_{22}$-aralkyl, where A and n have the same meaning as in formulae IV and V.

In a 3rd process stage, the reaction product obtained in the 2nd process stage is quaternized. The quaternization can, however, also be achieved by quaternizing the product obtainable in the 1st reaction stage and then carrying out the reaction given in the 2nd reaction stage.

Zwitterionic polyetherpolyamines of the formula VI are of particular technical interest:

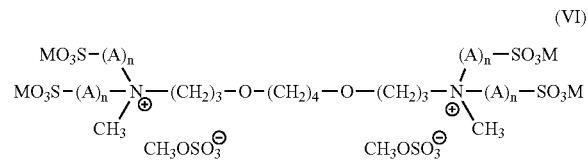

in which A is a group of the formulae $CH_2$—$CH_2$—O— or $CH(CH_3)CH_2$—O—, M is H, Na, K or ammonium, and n is a number from 15 to 25.

The molar mass of the zwitterionic polyetherpolyamines is usually up to 9000, preferably 1500 to 7500.

Zwitterionic crosslinked polyamines are obtainable, for example, by reacting aliphatic or araliphatic monoamines or polyamines having 2 to 5 primary, secondary or tertiary nitrogen groups with a crosslinking agent, for example in the ratio 20:1 to 1:1, based on molar amounts of amino groups in the amines and molar amounts of reactive groups in the crosslinkers to form crosslinked polyamines with molar masses of from 150 to 1500, alkoxylating the crosslinked amines, then introducing an anionic group into the products obtainable in this way by, for example, reacting these compounds, e.g. with a halosulfonic acid, halophosphoric acid, vinylsulfonic acid, propanesulfonic acid, haloacetic acid, acrylic acid, methacrylic acid, vinylphosphoric acid or the alkali metal or ammonium salts of said acid-containing compounds, and then quaternizing the products, e.g. with methyl bromide or dimethyl sulfate, it also being possible to carry out the quaternization directly after the alkoxylation of the crosslinked polyamines. It is also possible to use the above-described polyetheramines as polyamines. For example, it is possible to prepare suitable stabilizers by reacting 4,9-dioxadodecane-1,12-diamine with epichlorohydrin in the molar ratio 2:1, ethoxylating the reaction product obtainable therein, adding, for example, 20 mol of ethylene oxide per NH group, then quaternizing the reaction product with dimethyl sulfate, and sulfating the quaternized product in a further reaction stage by reaction with $SO_3$ or chlorosulfonic acid.

The compositions according to the invention preferably comprise at least one anionic surface-active substance. This is preferably chosen from the abovementioned anionic emulsifiers, the abovementioned acid-carrying, water-soluble amphiphilic polymers and mixtures thereof.

For the stability of the dispersions according to the invention, it has proven advantageous if they comprise 0.01 to 3% by weight, based on the oil phase, of at least one water-soluble, amphiphilic copolymer which has acid groups, preferably a salt thereof and optionally at least one anionic and/or nonionic emulsifier. The emulsifiers are preferably likewise used in an amount of from 0.01 to 3% by weight, based on the total weight of the oil phase. Also advantageous are those dispersions which comprise at least one anionic emulsifier and at least one nonionic emulsifier.

The dispersions according to the invention frequently also comprise at least one thickener for adjusting the viscosity required for the respective application. In principle, it is possible to use all thickeners known for thickening oil-in-water systems. These include natural thickeners, such as polysaccharides, carragenates, tragacanth, alginates, starch, caseinates, modified organic polymers, such as carboxymethylcellulose, synthetic thickeners, such as polyacrylic acids, polyvinyl alcohol, polyethylene glycols, polyacrylamides, and, in particular, copolymers of acrylamide with α,β-ethylenically unsaturated carboxylic acids, in particular with acrylic acid, and optionally with comonomers. These thickeners are described in EP-A 149 812, the disclosure of which is hereby referred to. Further suitable thickeners are mentioned in the overview article by Warren. B. Shapiro, Oil-in Water Emulsions, Cosmetics & Toiletries, Vol. 97, 1982, 27–33. Particular preference is also given to associative thickeners, e.g. hydrophobically modified polyurethanes, hydrophobically modified cellulose ethers, which form high molecular weight network structures in accordance with the principle of hydrophobic interaction in aqueous phase. Associative thickeners are known to the person skilled in the art, e.g. from J. Bielemann, Additives for Coatings, Wiley-VCH Weinheim 2000 and are commercially available, e.g. under the names RHOPLEX® and PRIMAL® TT 935 from Rohm & Haas, USA.

The dispersions according to the invention also frequently comprise commercially available biocides for preservation, e.g. formaldehyde, isothiazole compounds, and the products sold by ICI under the name PROXEL®.

The dispersions according to the invention are prepared, for example, by firstly melting the components which form the oil phase, then emulsifying these in water, optionally adding the desired surface-active substances to the still hot emulsion if the emulsified oil droplets are still liquid, and cooling the oil-in-water emulsion to form an oil-in-water dispersion. Said stabilizers can, however, also be added to the antifoam dispersion after cooling of the oil-in-water emulsion if the oil droplets have become solid.

One process variant for the preparation of particularly storage-stable antifoam dispersions consists in emulsifying the molten oil phase in an aqueous solution of at least one surface-active substance and optionally adding further emulsifiers after the emulsification to the hot oil-in-water emulsion, or after cooling to, for example, room temperature, to the antifoam dispersion.

As has been found, the dispersions according to the invention which, apart from the amphiphilic anionic copolymer, also comprise at least one preferably anionic emulsifier have an even lower tendency toward thickening and creaming than those antifoam dispersions which comprise only one amphiphilic anionic copolymer as stabilizer.

The aqueous dispersions according to the invention exhibit very good antifoaming and/or deaerating effects in aqueous systems which tend to foam. They are very effective particularly at higher temperatures, e.g. at temperatures above 40° C., in particular above 50° C. and specifically above 53° C. Compared with known antifoams, they have a significantly improved long-term action.

The aqueous dispersions are preferably used as antifoams and/or deaerators for controling foaming of aqueous media which have a tendency to form foam, for example in the foods industry, the starch industry and in waste treatment plants. The use of the aqueous dispersions according to the invention for controling foam in the case of aqueous compositions in the field of papermaking, e.g. during pulp cooking, pulp washing, the grinding of paper stock, papermaking and the dispersion of pigments for papermaking, is of particular interest. In these processes the temperature of the aqueous medium to be defoamed is in most cases above 40° C., e.g. in the temperature range from 45 to 75° C.

The oil-in-water dispersions according to the invention act as antifoams and also as deaerators. In some cases the deaerating action is more marked than the antifoaming action. They can be used as antifoams or deaerators. They are also advantageously used in the engine sizing and surface sizing of paper or in a paper coating plant. If these mixtures are used in paper stock suspensions, for example, their deaerating action is at the forefront.

The dispersions according to the invention are generally used in amounts of at least 0.001% by weight, based on the aqueous system to be defoamed, preferably in an amount of from 0.002 to 0.5% by weight and in particular 0.003 to 0.3% by weight. Based on 100% by weight of paper stock in a foam-forming medium, 0.002 to 0.5% by weight, in particular 0.003 to 0.3% by weight, of the deaerator is, for example, used.

The examples below serve to illustrate the invention and are not to be understood as being limiting.

The percentages in the examples refer to the weight unless otherwise stated in the examples.

The antifoaming/deaerating action was determined using a Sonica measuring device, exactly enough antifoam being added to a 0.38% paper stock suspension at 60° C. (dispersions D1 to D10, CD1, CD2) or at 50° C. and 55° C. (dispersion D11) for its concentration to be 5 ppm, based on the fatty phase (active substance). The air content was determined continuously by means of ultrasound attenuation prior to the metered addition of the antifoam and throughout the first 5 minutes after the metered addition. The content of air decreases initially and then increases again toward the end of the measurement. Table 1 gives the minimum air content of the paper stock suspension in % by volume and the value after 5 min in each case. This measurement method is described in TAPPI Journal, Vol. 71, p. 65–69 (1988). The lower the minimum air content and the lower the level achieved after 5 min., the better the antifoaming action.

Said paper stock suspension was used in all examples and comparative examples. Prior to the addition of a deaerator, it comprised about 1.4% by volume of air.

The particle sizes given are average values which were determined using a Coulter LS 230 instrument on about 0.1% strength dispersions. The instrument operates according to the principle of Fraunhofer diffraction.

The behenic acid used was the product EDENOR® C22 85R from Cognis Deutschland GmbH, Düsseldorf.

EXAMPLE 1

1st stage: 917 g of behenic acid were melted at a temperature of 115° C. under nitrogen in a 2 l four-necked flask fitted with thermometer, stirrer, dropping funnel and water separator with reflux condenser. 154.8 g of diethylenetriamine were then added thereto over the course of 20 min. During the addition, the temperature increased to 130° C. 5.4 g of p-toluenesulfonic acid and 5.4 g of a 50% strength by weight aqueous hypophosphorous acid were then added, and the temperature was slowly increased to 160° C. Over the course of a total of 3½ h, 52 ml of water distilled off. The mixture was then cooled. The acid number of the resulting wax was 7.8, and the amine number was 3.7. The melting point was 135° C.

2nd stage: the solidified mixture from the first stage was melted again. At an internal temperature of about 140° C., 87.1 g of fumaric acid and 2.8 g of p-toluenesulfonic acid were added and, with maintenance of the temperature, 1.5 ml of water distilled off over the course of 1 h. The mixture was then heated to 152° C., and a further 6.5 ml of water distilled off over the course of a further 2 h. The acid number of the resulting mixture was 34.3. The fixed point of the mixture was 92° C.

EXAMPLE 2

106.2 g of the wax prepared according to example 1 stage 1 and 18.3 g of adipic acid were melted at 150° C. under nitrogen, and 3.5 ml of water were distilled off over the course of a total of 9 hours. The acid number of the resulting mixture was 27.1, and the fixed point of the mixture was 80° C.

EXAMPLE 3

272.48 g of behenic acid were slowly heated, under nitrogen blanketing, to a temperature of 82° C. in a 1 l three-necked flask fitted with thermometer, stirrer and water separator with reflux condenser. Over the course of 12 minutes, 34.8 g of N,N'-bisaminopropylethylenediamine were added, and the temperature of the mixture increased to 110° C. The mixture was then heated for 4 hours at 155 to 156° C. until no more water distilled off. The acid number of the resulting mixture was 45.7, and the amine number was 0.79. The fixed point of the mixture was 86° C. The mixture was then cooled and the wax was broken.

EXAMPLE 4

52.1 g of N-aminoethylethanolamine, 339.6 g of behenic acid, 1.95 g of p-toluenesulfonic acid and 1.95 g of 50% strength by weight aqueous hypophosphorous acid ($H_3PO_2$) were combined in a 1 l three-necked flask fitted with thermometer, stirrer and water separator with reflux condenser, and slowly heated to a temperature of 150° C. Over the course of firstly 4 hours, 10.5 ml of water were distilled off. A vacuum of 400 mbar was then applied and, with maintenanace of the temperature, a further 5,5 ml of water were distilled off. The mixture was then cooled and the wax was broken. The acid number of the wax was 6.7, the amine number was 0.42 and the fixed point was 62° C.

EXAMPLE 5

195.8 g of the wax from example 4 were combined with 18.3 g of adipic acid in a 1 l three-necked flask fitted with thermometer, stirrer and water separator with reflux condenser, and slowly heated under reduced pressure to a temperature of 150° C. Over the course of firstly 4 hours, 1.9 ml of water were distilled off. Then, under application of a vacuum of 100 mbar, and with maintenance of the temperature, 0.5 ml of water was again removed over the course of a further 4 hours. The mixture was then cooled and the wax was broken. The acid number of the wax was 25.9, the amine number was 0.15 and the fixed point was 76° C.

EXAMPLE 6

221.4 g of behenic acid and 10.96 g of adipic acid were combined in a 1 l three-necked flask fitted with thermometer, stirrer and water separator with reflux condenser, and heated, under nitrogen, to a temperature of 82° C. 34.8 g of N,N'-bisaminopropyl-ethylenediamine were added thereto over the course of 15 minutes, during which the temperature of the mixture increased to 108° C. The mixture was then heated for 5 hours at 155 to 158° C. until no more water distilled off. The acid number of the wax was 45, the amine number was 0.96 and the fixed point was 82° C.

EXAMPLE 7

276.7 g of behenic acid were heated, under nitrogen, to a temperature of 76° C. in a 1 l three-necked flask fitted with thermometer, stirrer and water separator with reflux condenser. Then, over the course of 20 minutes, 50 g of a polyethyleneimine with a molar mass of 1000 were added, during which the temperature of the mixture increased to 82° C. The mixture was heated for 5 hours at 155° C. until no more water could be distilled off. The acid number of the reaction mixture was 0.76 mg of KOH/g. The mixture was cooled and the wax was broken. The fixed point of the wax was 82° C.

EXAMPLE 8

169.3 g of hydroxyethylpiperazine, 441.5 g of behenic acid, 3.1 g of p-toluenesulfonic acid and 3.1 g of 50% strength by weight aqueous hypophosphorous acid ($H_3PO_2$) were combined in a 1 l three-necked flask fitted with thermometer, stirrer and water separator with reflux condenser, and heated to a temperature of 150° C. Over the course of 5 hours, and at this temperature with application of a vacuum (down to a final pressure of 160 mm), 14.5 ml of water were distilled off. The mixture was then cooled and the wax was broken. The acid number of the wax was 10.0 and the fixed point of the wax was 62° C.

EXAMPLE 9

1st stage: 850 g of behenic acid were melted at a temperature of 120° C. under nitrogen in a 1 l four-necked flask fitted with thermometer, stirrer, dropping funnel and water separator with reflux condenser. Then, over the course of 20 min., 174.3 g of N,N'-bis(3-aminopropyl)ethylenediamine were added thereto. During the addition the temperature increased to 126° C. 5.1 g of p-toluenesulfonic acid and 5.1 g of a 50% strength by weight aqueous hypophosphorous acid were then added, and the temperature was increased slowly to 155° C. Over the course of a total of 8 h, 41 ml of water distilled off. The mixture was then cooled. The acid number of the resulting wax was 17.5. The melting point was 114° C.

2nd stage 227.1 g of the mixture obtained in the 1st stage were melted under nitrogen. 17.4 g of fumaric acid were added to the mixture, which was then heated to 150° C. and this temperature was maintained for 5 h and a total of 2.1 ml of water distilled off. The wax obtained after cooling had an acid number of 26.5. The fixed point of the mixture was 90° C.

EXAMPLE 10

1st stage (Mixture of Mono- and Dibehenate): 340.6 g of behenic acid were melted at a temperature of 120° C. under nitrogen in a 1 l four-necked flask fitted with thermometer, stirrer, dropping funnel and water separator with reflux condenser. Then, over the course of 15 minutes, 103.2 g of diethylenetriamine were added dropwise. During the addition, the temperature increased to 130° C. The temperature was then slowly increased to 150° C. Over the course of a total of 6 hours, 19.1 g of water were distilled off. The mixture was then cooled. The acid number of the resulting wax was 2.5, the amine number was 4.39. The resulting product had a melting range from 92 to 104° C.

2nd stage: 150 g of the product obtained in stage 1 were heated to a temperature of 195° C. in a three-necked flask fitted with stirrer, internal thermometer and water separator with reflux condenser, and maintained at this temperature for 4 hours. During this time, 8.5 g of water distilled off. The amidine formed in the process had an acid number of 1.6, an amine number of 2.16 and a melting point of 80° C.

3rd stage: 100 g of the amidine obtained in stage 2 and 12.5 g of fumaric acid were melted at 130° C. in a three-necked flask fitted with stirrer, internal thermometer and water separator with reflux condenser and then kept at 150° C. for 5¾ hours. During this time, a total of 0.7 g of water was distilled off. After cooling, the product was analyzed: acid number 27.0; amine number 0.775; melting point 78° C.

EXAMPLE 11

1st stage: (Mixture of Mono- and Dibehenate): 103.2 g of diethylenetriamine were introduced at 170° C. into a 1 l four-necked flask fitted with thermometer, stirrer, dropping funnel and water separator with reflux condenser, and 340.6 g of behenic acid were added dropwise over 5½ h from a heatable dropping funnel. During this time, a total of 14.3 g of water distilled off. The product had an acid number of 5.8 and an amine number of 5.8.

2nd stage: 300 g of the product obtained in stage 1 were mixed, in a three-necked flask fitted with stirrer, water separator with reflux condenser and internal thermometer, with 100 g of nonane (boiling point 150° C.), and 14.3 g of a liquid which is immiscible with nonane were separated off at a temperature of from 140 to 150° C. over the course of a total of 8 h. (The mixture here comprised about 75% water and about 25% diethylenetriamine). The amine number dropped during this time from 4.0 to 3.14.

3rd stage: 100 g of the product obtained in stage 2 and 12.5 g of fumaric acid were melted at 130° C. in a three-necked flask fitted with stirrer, internal thermometer and water separator with reflux condenser and then kept at 150° C. for 5¾ hours. During this time, a total of 0.7 g of water was distilled off. After cooling, the product was analyzed: acid number 27.0; amine number 0.775; melting point 78° C.

Preparation of Dispersions D1 to D12

General Procedure A:

A mixture consisting of 18.4 g of a fatty alcohol mixture of $C_{12}$–$C_{26}$-alcohols, 7.3 g of a glycerol triester of $C_{16}$–$C_{18}$ fatty acids and 1.6 g of component b) according to table 1 was melted at 90° C. giving a homogeneous melt. This melt was emulsified using a dispersing apparatus (Ultraturrax) in a 90° C.-hot mixture consisting of 2 g of emulsifier (45% strength by weight solution of the sodium salt of the sulfuric monoester of ethoxylated isooctylphenol with a degree of ethoxylation of 25), 0.5 g of a 32.4% strength by weight water-in-oil emulsion of an anionic polyacrylamide (sodium salt of a copolymer of 30% by weight of acrylic acid and 70% by weight of acrylamide with a K value of 270 (0.5% by weight polymer in 3% strength by weight aqueous sodium chloride solution)), 0.04 g of 10% strength sulfuric acid, 0.1 g of 30% strength aqueous formaldehyde solution and 70.06 g of water over the course of 60 seconds. This gave a speck-free emulsion with a particle size $d_{50}$ of 4.5 μm. This emulsion was cooled rapidly to room temperature, giving a dispersion (hardening of the oil droplets).

General Procedure B:

22.5 g of a mixture of 3-thia–$C_{20-28}$-alkan-1-ols, prepared in accordance with the example "thiaalkanol A" of WO 00/44470, 1.6 g of component b) according to table 1 were melted at 90° C., giving a homogeneous melt. This was emulsified using a dispersing apparatus (Ultraturrax) in a 90° C.-hot solution of 1.3 g of a 35% strength by weight aqueous ammoniacal solution of a polymer based on 50 parts by weight of styrene and 50 parts by weight of acrylic acid (obtainable from S. C. Johnson under the name Joncryl EEC 207), 0.5 g of a 32.4% strength by weight water-in-oil emulsion of an anionic polyacrylamide (product name or more accurate characterization), 0.04 g of 10% strength sulfuric acid, 0.1 g of 30% strength aqueous formaldehyde solution and 70.06 g of water over the course of 60 seconds. This gave a speck-free emulsion with a particle size $d_{50}$ of 2.5 μm. This emulsion was cooled rapidly to room temperature, giving a dispersion (hardening of the oil droplets).

General Procedure C (Preparation of Dispersion D10):

Dispersion D10 was prepared using the active substance from example 1 analogously to procedure A, but replacing 1 g of the fatty alcohol mixture with 1 g of a polyglycerol (comprising 27% diglycerol, 44% triglycerol, 19% tetraglycerol and 10% more highly condensed polyglycerols) esterified to 95% with behenic acid. Dispersion D10 had comparable properties to dispersion D1.

General Procedure D (Preparation of Dispersion D12):

Dispersion 12 was prepared using the active substance from example 11 analogously to procedure C, but using 1.1 g of a 45% strength aqueous solution of a bis-sulfated dodecyldiphenyl oxide, which is available under the name DOWFAX 2 A 1 from DOW Chemical, as emulsifier, and 3 g of a finely divided 72% strength suspension of a finely divided clay as stabilizer.

Comparison Dispersion Example CD1

The comparison dispersion CD1 was prepared analogously to procedure A, using a polyglycerol ester obtainable by 95% esterification of a polyglycerol mixture consisting of 27% diglycerol, 44% triglycerol, 19% tetraglycerol and 10% more highly condensed polyglycerols with behenic acid (=PGB) instead of the active substance according to the invention.

Comparison Dispersion Example CD2

The comparison dispersion CD2 was prepared analogously to procedure B, using a polyglycerol ester obtainable by 95% esterification of a polyglycerol mixture consisting of 27% diglycerol, 44% triglycerol, 19% tetraglycerol and 10% more highly condensed polyglycerols with behenic acid instead of the active subtance according to the invention.

TABLE 1

Deaerating properties of dispersions D1 to D11, CD1 and CD2

| Dispersion | Component b) | Recipe | min. air[1] [% by vol.] at 60° C. | Air 5 min[2] [% by vol.] at 60° C. |
|---|---|---|---|---|
| D1 | 1 | A | 0.37 | 0.84 |
| D2 | 2 | A | 0.45 | 1.19 |
| D3 | 3 | A | 0.49 | 1.29 |
| D4 | 4 | A | 0.50 | 1.15 |
| D5 | 5 | A | 0.52 | 1.03 |
| CD1 | PGB[3] | A | 0.71 | 1.21 |
| D6 | 6 | B | 0.64 | 1.20 |
| D7 | 7 | B | 0.68 | 1.22 |
| D8 | 8 | B | 0.69 | 1.24 |
| CD2 | PGB[3] | B | 0.87 | 1.16 |
| D9 | 9 | A | 0.43 | 1.19 |
| D10 | 1 | C | 0.34 | 1.30 |
| | | | min. air[1] [% by vol.] at 50/55° C. | Air 5 min[2] [% by vol.] at 50/55° C. |
| D11 | 10 | A | 0.43/0.39 | 0.95/1.18 |

[1]Minimum air content
[2]Air content 5 min. after minimum air content
[3]PGB = polyglycerol ester of behenic acid Table 1 demonstrates the improved antifoaming action of the dispersions according to the invention compared with PGB-containing dispersions.

We claim:

1. An oil-in-water dispersion, the oil phase of which comprises the following components:
   a) at least one water-insoluble oxygen-containing organic substance which is solid at room temperature selected from the group consisting of a long-chain alcohols with an aliphatic hydrocarbon radical having at least 12 carbon atoms and which may be interrupted by S, SO or $SO_2$, distillation residues which form during the preparation of aliphatic alcohols with at least 14 carbon atoms, mono-, di- and triglycerides of fatty acids, fatty acid esters of aliphatic alcohols with at least 12 carbon atoms, fatty acid esters of $C_1$–$C_{11}$-alkanols and mixtures thereof;

b) at least one reaction product of at least one crosslinking compound V which has at least bifunctional reactivity toward the reactive groups and at least one amide compound of the formula I and/or of an amidine compound of the formula Ia,

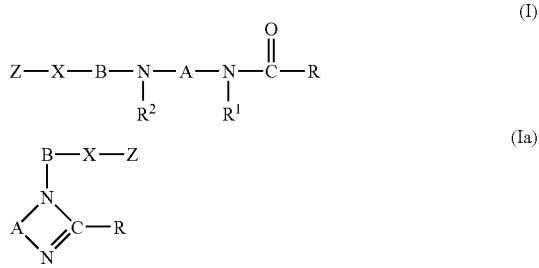

in which the variables R, $R^1$, $R^2$, A, B, X and Z have the following meanings:

R is an aliphatic radical with at least 14 carbon atoms, which may optionally have 1 or 2 hydroxyl groups, 1 or 2 double bonds and/or 1 or 2 triple bonds, A, B, independently of one another, are $C_2$–$C_{20}$-alkylene which may optionally have 1 or 2 OH groups, 1 or 2 double and/or triple bonds and/or be interrupted by one or two oxygen atoms which are nonadjacent to heteroatoms, or $C_5$–$C_{20}$-cycloalkylene which may optionally be substituted by 1 or 2 OH groups and/or by 1, 2, 3 or 4 methyl groups and/or can have a carbonyl function as ring member, $R^1$ is hydrogen, $C_1$–$C_{13}$-alkyl, $C_5$–$C_{10}$-cycloalkyl, phenyl or a group of the formula $[A^1\text{-}X^1]_m\text{-}Z^1$, $R^2$ is hydrogen, $C_1$–$C_{13}$-alkyl, $C_5$–$C_{10}$-cycloalkyl, phenyl, a group C(O)—R or a group of the formula $[A^2\text{-}X^2]_n\text{-}Z^2$, X is oxygen or a group N—$R^3$, in which $R^3$ has the following meanings: hydrogen, a group C(O)—R or a group of the formula $[A^3\text{-}X^3]_p\text{-}Z^3$, Z is hydrogen or a group $[A^4\text{-}X^4]_q\text{-}Z^4$, in which $A^1$, $A^2$, $A^3$, $A^4$, independently of one another, are $C_2$–$C_3$-alkylene, $X^1$, $X^2$, $X^3$, $X^4$, independently of one another, are oxygen or a group $NR^a$, in which $R^a$, independently of the others, is hydrogen, $CH_2CH_2NH_2$, $CH_2CH_2NHC(O)R$, $CH_2CH_2CH_2NH_2$, $CH_2CH_2CH_2NHC(O)R$ or a group C(O)—R, $Z^1$, $Z^2$, $Z^3$, $Z^4$, independently of one another, are hydrogen, $CH_2CH_2NH_2$, $CH_2CH_2NHC(O)R$, $CH_2CH_2CH_2NH_2$ or $CH_2CH_2CH_2NHC(O)R$, and m and q, independently of one another, are a number from 1 to 20, n and p, independently of one another, are a number from 1 to 10, where $R^1$ with $R^2$ or $R^2$ with $R^3$ and/or any two radicals $R^3$, $R^4$, $R^a$ which are bonded to two nitrogen atoms bonded by an alkylene unit may also be $C_1$–$C_4$-alkylene which may have a carbonyl function and/or may be substituted by 1, 2 or 3 methyl groups, or the group B-X-Z is hydrogen if A is $C_6$–$C_{20}$-alkylene which is interrupted by one or two oxygen atoms which are nonadjacent to heteroatoms, or is $C_5$–$C_{20}$-cycloalkylene which may optionally be substituted by 1 or 2 OH groups and/or by 1, 2, 3 or 4 methyl groups and/or may have a carbonyl function as ring member;

wherein the amide compound of formula I and the amidine compound of formula Ia have at least one reactive group RG selected from the group consisting of an alcoholic OH group, an aminic NH group, and an $NH_2$ group;

and/or a reaction product of an amino-containing polymer with an aliphatic carboxylic acid of the formula R—COOH in which R has the meaning given above;

and optionally the following components:

c) substances which are known to improve the antifoaming action of oil-in-water dispersions;

d) one or more hydrocarbons with a boiling point above 200° C. at atmospheric pressure.

2. The dispersion as claimed in claim 1, wherein component b) is at least one reaction product of at least one compound of the formula I, which on average has at least one reactive group RG, with at least one at least bifunctional, crosslinking compound V.

3. The dispersion as claimed in claim 2, where the crosslinking compound V is selected from the group consisting of aliphatic and cycloaliphatic di- and tricarboxylic acids with 2 to 20 carbon atoms, the ester- or amide-forming derivatives thereof, α,β-monoethylenically unsaturated mono-, di- and tricarboxylic acids with 3 to 10 carbon atoms, the ester- or amide-forming derivatives thereof, and derivatives of carbonic acid.

4. The dispersion as claimed in claim 3, wherein component b) is characterized by an acid number in accordance with DIN 53402 of at most 40.

5. The dispersion as claimed in claim 1, wherein the aqueous phase comprises at least one surface-active substance.

6. The dispersion as claimed in claim 5, where the surface-active substance comprises at least one anionic surface-active substance selected from the group consisting of anionic emulsifiers and micelle-forming polymers having acid groups.

7. The dispersion as claimed in claim 1, wherein R in formula I has at least 19 carbon atoms.

8. The dispersion as claimed in claim 1, wherein the reaction products of I or Ia with the crosslinking compound have at least two radicals of the formula R—C(O)—, in which R is an aliphatic radical with at least 14 carbon atoms, which may optionally have 1 or 2 hydroxyl groups, 1 or 2 double bonds and/or 1 or 2 triple bonds.

9. The dispersion as claimed in claim 1, wherein variables A, B, R1, $R^2$, X and Z in formula I have the following meanings:

A, B, independently of one another, are $C_2$–$C_4$-alkylene, $R^1$ is hydrogen or $[A^1\text{-}X^1]_m$—H, in which $A^1$ is $C_2$–$C_3$-alkylene and $X^1$ is oxygen or a group $NR^a$, in which $R^a$, independently of the others, is hydrogen or C(O)R, and m is a number from 1 to 10, $R^2$ is hydrogen or $[A^2\text{-}X^2]_n$—H, in which $A^2$ is $C_2$–$C_3$-alkylene and $X^2$ is oxygen or a group $NR^a$, in which $R^a$, independently of the others, is hydrogen or C(O)R, and n is a number from 1 to 10, or $R^1$ forms a $C_2$–$C_4$-alkylene group with $R^2$, or $R^2$ forms a $C_2$–$C_4$-alkylene group with $R^3$, X is oxygen or a group N—$R^3$, in which $R^3$ has the following meanings: hydrogen or a group C(O)—R, Z is hydrogen or a group $[A^4\text{-}X^4]_q$—$Z^4$, in which $A^4$ is $C_2$–$C_3$-alkylene and $X_4$ is oxygen or a group $NR^a$, in which $R^a$, independently of the others, is hydrogen or C(O)R and $Z^4$ is hydrogen, and q is a number from 1 to 10.

10. The dispersion as claimed in claim 1, wherein the variables A, B, $R^1$, $R^2$, X and Z in formula I have the following meanings:

A is $C_5$–$C_{20}$-alkylene which is interrupted by one or two oxygen atoms which are nonadjacent to heteroatoms, $R^1$ is hydrogen or a group of the formula $[A^1\text{-}X^1]_m\text{-}Z^1$, in which $A^1$ is $C_2$–$C_3$-alkylene and $X^1$ is oxygen or a group $NR^a$, in which $R^a$, independently of one another, are hydrogen or $C(O)R$ and $Z^1$ is hydrogen, and m is a number from 0 to 10, $R^2$ is hydrogen or a group $C(O)$–R and the group Z-X—B is hydrogen.

11. The dispersion as claimed claim 1, wherein component b) has an amine number below 3 in accordance with DIN 16945.

12. The dispersion as claimed in claim 1, wherein component b) is obtained by an at least 20% amidation of the NH and $NH_2$ groups of an amine of the formula II:

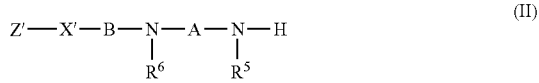

in which the variables $R^5$, $R^6$, A, B, X' and Z' have the following meanings:

A, B, independently of one another, are $C_2$–$C_{20}$-alkylene which may optionally have 1 or 2 OH groups, 1 or 2 double and/or triple bonds and/or be interrupted by one or two oxygen atoms which are nonadjacent to heteroatoms, or $C_5$–$C_{20}$-cycloalkylene which may optionally be substituted by 1 or 2 OH groups and/or by 1, 2, 3 or 4 methyl groups and/or may have a carbonyl function as ring member, $R^5$ is hydrogen, $C_1$–$C_{13}$-alkyl, $C_5$–$C_{10}$-cycloalkyl, phenyl or a group of the formula $[A^5\text{-}X^5]_r$—H, $R^6$ is hydrogen, $C_1$–$C_{13}$-alkyl, $C_5$–$C_{10}$-cycloalkyl, phenyl or a group of the formula $[A^6\text{-}X^6]_s$—H, X' is oxygen or a group N—$R^7$, in which $R^7$ has the following meanings: hydrogen, a group $C(O)$—R or a group of the formula $[A^7\text{-}X^7]_t$—H, Z' is hydrogen or a group $[A^8\text{-}X^8]_u$—H, in which $A^5$, $A^6$, A7, $A^8$, independently of one another, are $C_2$–$C_3$-alkylene, $X^5$, $X^6$, $x^7$, $x^8$, independently of one another, are oxygen or a group $NR^b$ in which $R^b$ is hydrogen, $CH_2CH_2NH_2$ or $CH_2CH_2CH_2NH_2$, and r and u, independently of one another, are a number from 0 to 21, s and t, independently of one another, are a number from 0 to 11, where $R^5$ with $R^6$ or $R^6$ with $R^7$ and/or any two radicals $R^7$, $R^8$, $R^b$ which are bonded to two nitrogen atoms bonded via an alkylene unit may also be $C_1$–$C_4$-alkylene which may have a carbonyl function and/or may be substituted by 1, 2 or 3 methyl groups, or the group Z'-X'—B is hydrogen if A is $C_6$–$C_{20}$-alkylene which is interrupted by one or two oxygen atoms which are nonadjacent to heteroatoms, or is $C_5$–$C_{20}$-cycloalkylene which may optionally be substituted by 1 or 2 OH groups and/or by 1, 2, 3 or 4 methyl groups and/or may have a carbonyl function as ring member, with a long-chain carboxylic acid of the formula R—COOH or an amide-forming derivative of this carboxylic acid in which R is an aliphatic radical with at least 14 carbon atoms, which may optionally have 1 or 2 hydroxyl groups, 1 or 2 double bonds and/or 1 or 2 triple bonds, and reaction of the reaction product obtained in the amidation with at least one crosslinking, at least bifunctional compound V.

13. The dispersion as claimed in claim 1, wherein the proportion by weight of component b), based on the total weight of the oil phase, is in the range from 1 to 20% by weight.

14. A method of controlling the foaming of an aqueous system which tends to foam, said method comprising the addition of an effective amount of an aqueous dispersion as claimed in claim 1 to the aqueous system which tends to foam.

15. A method of deaerating an aqueous system which tends to foam, said method comprising the addition of an effective amount of an aqueous dispersion as claimed in claim 1 to the aqueous system which tends to foam.

16. An oil-in-water dispersion, the oil phase of which comprises the following components:

a) at least one water-insoluble oxygen-containing organic substance which is solid at room temperature selected from the group consisting of long-chain alcohols with an aliphatic hydrocarbon radical having at least 12 carbon atoms and which may be interrupted by S, SO or $SO_2$, distillation residues which form during the preparation of aliphatic alcohols with at least 14 carbon atoms, mono-, di- and triglycerides of fatty acids, fatty acid esters of aliphatic alcohols with at least 12 carbon atoms, fatty acid esters of $C_1$–$C_{11}$-alkanols and mixtures thereof;

b) at least one amide compound of the formula I:

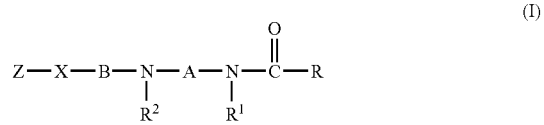

and/or an amidine compound of the formula Ia:

wherein R is an aliphatic radical with at least 19 carbon atoms, which may optionally have 1 or 2 hydroxyl groups, 1 or 2 double bonds and/or 1 or 2 triple bonds, and in which the variables $R^1$, $R^2$, A, B, X and Z have the meanings given in claim 1, and optionally the following components:

c) substances which are known to improve the antifoaming action of oil-in-water dispersions;

d) one or more hydrocarbons with a boiling point above 200° C. at atmospheric pressure.

17. The dispersion as claimed in claim 16, wherein component a) comprises, as main constituent, at least one long-chain alcohol with an aliphatic hydrocarbon radical having at least 12 carbon atoms.

18. The dispersion as claimed in claim 17, wherein the aliphatic alcohol is at least one compound of the formula III,

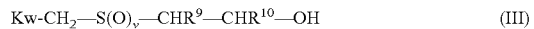

in which Kw is an alkyl radical with 11 to 35 carbon atoms, $R^9$ and $R^{10}$, independently of one another, are hydrogen, or a methyl, ethyl or phenyl, and v is 0, 1 or 2.

19. The dispersion as claimed in claim 17, wherein the long-chain alcohol is an aliphatic fatty alcohol with 12 to 36 carbon atoms.

20. The dispersion as claimed in claim 17, wherein component a) additionally comprises at least one triglyceride of a fatty acid.

21. The dispersion as claimed in claim 17, wherein component a) additionally comprises a fatty acid ester of an aliphatic alcohol with at least 12 carbon atoms.

22. The dispersion as claimed in claim 17, wherein the oil phase comprises a component c) which is is at least one substance obtained by at least 20% esterification of the OH groups of oligo- or polyglycerols with at least one aliphatic $C_{12}$–$C_{35}$-carboxylic acid.

23. The dispersion as claimed in claim 16, wherein component a) comprises, as the main constituent, at least one long-chain alcohol with an aliphatic hydrocarbon radical having at least 12 carbon atoms.

24. The dispersion as claimed in claim 23, wherein the aliphatic alcohol is at least one compound of the formula III, $$\text{Kw-CH}_2\text{—S(O)}_v\text{—CHR}^9\text{—CHR}^{10}\text{—OH} \quad \text{(III)}$$

in which Kw is an alkyl radical with 11 to 35 carbon atoms, $R^9$ and $R^{10}$, independently of one another, are hydrogen, methyl, ethyl or phenyl, and v is 0, 1 or 2.

25. The dispersion as claimed in claim 23, wherein the long-chain alcohol is an aliphatic fatty alcohol with 12 to 36 carbon atoms.

26. The dispersion as claimed in claim 23, wherein component a) additionally comprises at least one triglyceride of a fatty acid.

27. The dispersion as claimed in claim 23, wherein component a) additionally comprises a fatty acid ester of an aliphatic alcohol with at least 12 carbon atoms.

28. The dispersion as claimed claim 16, wherein the compounds of the formulae I or Ia carry at least two radicals of the formula R—C(O)—, in which R is an aliphatic radical with at least 14 carbon atoms, which may optionally have 1 or 2 hydroxyl groups, 1 or 2 double bonds and/or 1 or 2 triple bonds.

29. The dispersion as claimed in claim 28, wherein the proportion by weight of component b), based on the total weight of the oil phase, is in the range from 1 to 20% by weight.

30. The dispersion as claimed in claim 16, wherein the aqueous phase comprises at least one surface-active substance.

31. The dispersion as claimed in claim 30, where the surface-active substance comprises at least one anionic surface-active substance selected from the group consisting of anionic emulsifiers and micelle-forming polymers having acid groups.

32. The dispersion as claimed in claims 16, wherein the variables A, B, $R^1$, $R^2$, X and Z in formula I have the following meanings:

A, B, independently of one another, are $C_2$–$C_4$-alkylene,
$R^1$ is hydrogen or $[A^1\text{-}X^1]_m$—H, in which $A^1$ is $C_2$–$C_3$-alkylene and $X^1$ is oxygen or a group $NR^a$, in which $R^a$, independently of the others, is hydrogen or C(O)R, and m is a number from 1 to 10,
$R^2$ is hydrogen or $[A^2\text{-}X^2]_n$—H, in which A is $C_2$–$C_3$-alkylene and $X^2$ is oxygen or a group $NR^a$, in which $R^a$, independently of the others, is hydrogen or C(O)R, and n is a number from 1 to 10, or
$R^1$ forms a $C_2$–$C_4$-alkylene group with $R^2$, or $R^2$ forms a $C_2$–$C_4$-alkylene group with $R^3$,
X is oxygen or a group N—$R^3$, in which $R^3$ has the following meanings: hydrogen or a group C(O)—R,
Z is hydrogen or a group $[A^4\text{-}X^4]_q\text{-}Z^4$, in which $A^4$ is $C_2$–$C_3$-alkylene and $X^4$ is oxygen or a group $NR^a$, in which $R^a$, independently of the others, is hydrogen or C(O)R and $Z^4$ is hydrogen, and q is a number from 1 to 10.

33. The dispersion as claimed in claim 16, wherein the variables A, B, $R^1$, $R^2$, X and Z in formula I have the following meanings:

A is $C_5$–$C_{20}$-alkylene which is interrupted by one or two oxygen atoms which are nonadjacent to heteroatoms,
$R^1$ is hydrogen or a group of the formula $[A^1\text{-}X^1]_m\text{-}Z^1$, in which $A^1$ is $C_2$–$C_3$-alkylene and $X^1$ is oxygen or a group $NR^a$, in which $R^a$, independently of one another, are hydrogen or C(O)R and $Z^1$ is hydrogen, and m is a number from 0 to 10,
$R^2$ is hydrogen or a group C(O)—R and the group Z-X—B is hydrogen.

34. The dispersion as claimed in claim 16, wherein component b) has an amine number below 3 in accordance with DIN 16945.

35. A dispersion as claimed in claim 16, wherein component b) is obtained by an at least 20% amidation of the NH and $NH_2$ groups of an amine of the formula II

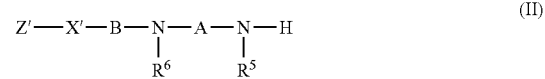

in which the variables $R^5$, $R^6$, A, B, X' and Z' have the following meanings:

A, B, independently of one another, are $C_2$–$C_{20}$-alkylene which may optionally have 1 or 2 OH groups, 1 or 2 double and/or triple bonds and/or be interrupted by one or two oxygen atoms which are nonadjacent to heteroatoms, or $C_5$–$C_{20}$-cycloalkylene which may optionally be substituted by 1 or 2 OH groups and/or by 1, 2, 3 or 4 methyl groups and/or may have a carbonyl function as ring member,
$R^5$ is hydrogen, $C_1$–$C_{13}$-alkyl, $C_5$–$C_{10}$-cycloalkyl, phenyl or a group of the formula $[A^5\text{-}X^5]_r$—H,
$R^6$ is hydrogen, $C_1$–$C_{13}$-alkyl, $C_5$–$C_{10}$-cycloalkyl, phenyl or a group of the formula $[A^6\text{-}X6]_s$—H,
X' is oxygen or a group N—$R^7$, in which $R^7$ has the following meanings: hydrogen, a group C(O)—R or a group of the formula $[A^7\text{-}X^7]_t$—H,
Z' is hydrogen or a group $[A^8\text{-}X^8]_u$—H,
in which $A^5$, $A^6$, $A^7$, $A^8$, independently of one another, are $C_2$–$C_3$-alkylene, $X^5$, $X^6$, $X^7$, $X^8$ of one are oxygen or a group $NR^b$ in which $R^b$ is hydrogen, $CH_2CH_2NH_2$ or $CH_2CH_2CH_2NH_2$, and r and u, independently of one another, are a number from 0 to 21, s and t, independently of one another, are a number from 0 to 11,
where $R^5$ with $R^6$ or $R^6$ with $R^7$ and/or any two radicals $R^7$, $R^8$, $R^b$ which are bonded to two nitrogen atoms bonded via an alkylene unit may also be $C_1$–$C_4$-alkylene which may have a carbonyl function and/or may be substituted by 1, 2 or 3 methyl groups,
or the group Z'-X'—B is hydrogen if A is $C_6$–$C_{20}$-alkylene which is interrupted by one or two oxygen atoms which are nonadjacent to heteroatoms, or is $C_5$–$C_{20}$-cycloalkylene which may optionally be substituted by 1 or 2 OH groups and/or by 1, 2, 3 or 4 methyl groups and/or may have a carbonyl function as ring member, with a long-chain carboxylic acid of the formula R—COOH or an amide-forming derivative of this carboxylic acid in which R is an aliphatic radical with at least 19 carbon atoms, which may optionally have 1 or 2 hydroxyl groups, 1 or 2 double bonds and/or 1 or 2 triple bonds.

36. The dispersion as claimed in claim 16, wherein the oil phase comprises a component c) which is at least one substance obtained by at least 20% esterification of the OH groups of oligo- or polyglycerols with at least one aliphatic $C_{12}$–$C_{35}$-carboxylic acid.

37. A method of controlling the foaming of an aqueous system which tends to foam, said method comprising the addition of an effective amount of an aqueous dispersion as claimed in claim 16 to the aqueous system which tends to foam.

38. A method of deaerating of an aqueous system which tends to foam, said method comprising the addition of an effective amount of an aqueous dispersion as claimed in claim 16 to the aqueous system which tends to foam.

39. The dispersion as claimed in claim 16, the proportion of the water-insoluble oxygen-containing organic substance ranges from 50 to 95% by weight.

40. The dispersion as claimed in claim 16, wherein the proportion of the oil phase in the aqueous dispersion ranges from 5 to 50% by weight.

41. The dispersion as claimed in claim 16, wherein the proportion of the oil phase in the aqueous dispersion ranges from 10 to 40% by weight.

* * * * *

UNITED STATES PATENT AND TRADEMARK OFFICE
CERTIFICATE OF CORRECTION

PATENT NO. : 7,183,325 B2
APPLICATION NO. : 10/478683
DATED : February 27, 2007
INVENTOR(S) : Rainer Dyllick-Brenzinger et al.

It is certified that error appears in the above-identified patent and that said Letters Patent is hereby corrected as shown below:

Title page
Item 54 "DEFORMING AGENT" should read --DEFOAMING AGENT--

Column 1, line 1, "DEFORMING AGENT" should read --DEFOAMING AGENT--

Column 33, line 42, "$x^7, x^{8"},$" should read --$X^7, X^8,$ --

Column 35, line 54, "claims" should read --claim--

Column 35, line 62, "A is" should read --$A^2$ is --

Column 36, line 46 "$[A^6-X6]_s-H,$ " should read --"$[A^6-X^6]_s -H,$--

Signed and Sealed this

Twenty-sixth Day of June, 2007

JON W. DUDAS
*Director of the United States Patent and Trademark Office*